United States Patent
Miyashita et al.

(10) Patent No.: US 6,804,457 B1
(45) Date of Patent: Oct. 12, 2004

(54) DIGITAL VIDEO SIGNAL RECORDER/REPRODUCER AND TRANSMITTER

(75) Inventors: Mitsuhiro Miyashita, Nishinomiya (JP); Masakazu Nishino, Kashiwara (JP); Yuji Fujiwara, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,044

(22) PCT Filed: Apr. 7, 2000

(86) PCT No.: PCT/JP00/02252

§ 371 (c)(1),
(2), (4) Date: Dec. 7, 2000

(87) PCT Pub. No.: WO00/62541

PCT Pub. Date: Oct. 19, 2000

(30) Foreign Application Priority Data

Apr. 8, 1999 (JP) .......................... 11-101221

(51) Int. Cl.$^7$ ............................... H04N 7/26
(52) U.S. Cl. ..................... 386/109; 386/112
(58) Field of Search ................ 386/111, 109, 386/112, 124, 125, 126, 27, 33, 45, 46, 37, 40; 348/384.1, 390.1, 397.1, 398.1, 403.1, 420.1; H04N 7/26

(56) References Cited

U.S. PATENT DOCUMENTS

| | | | |
|---|---|---|---|
| 5,377,051 A | * | 12/1994 | Lane et al. .................... 386/81 |
| 6,137,953 A | * | 10/2000 | Fujiwara et al. .............. 386/95 |
| 6,714,681 B1 | * | 3/2004 | Nakamura ................... 382/233 |

FOREIGN PATENT DOCUMENTS

| | | |
|---|---|---|
| JP | 7-193809 | 7/1995 |
| JP | 9-214887 | 8/1997 |
| JP | 10-93991 | 4/1998 |

* cited by examiner

*Primary Examiner*—Robert Chevalier
(74) *Attorney, Agent, or Firm*—Wenderoth, Lind & Ponack, L.L.P.

(57) ABSTRACT

When recording/reproducing a digital video signal having 1080 effective lines, an MPEG stream can be extracted on the reproducing side with a simple structure and without causing serious deterioration of the image quality, and without wastefully consuming the capacity of the recording medium. To achieve this object, a macro block assembling circuit (semi-MPEG) 20 in the compression circuit 10 assembles macro blocks having 16 lines and macro blocks having 8 lines from the digital video signal. A DCT circuit (MPEG) 22 applies field DCT or frame DCT defined by the MPEG standard to the macro blocks with 16 lines and applies only the frame DCT defined by the MPEG standard to the macro blocks with 8 lines.

19 Claims, 27 Drawing Sheets

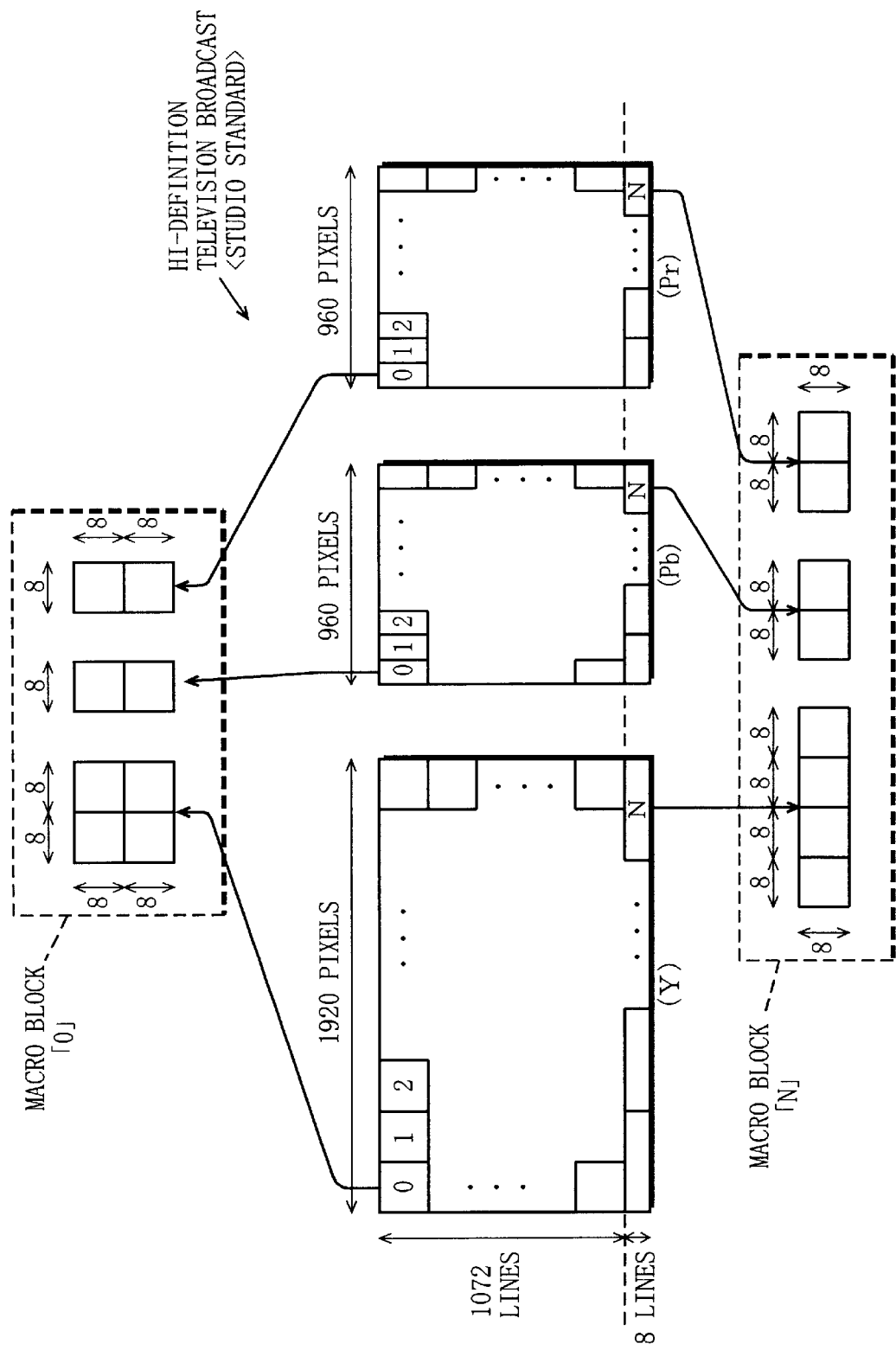
F I G. 4

F I G. 7
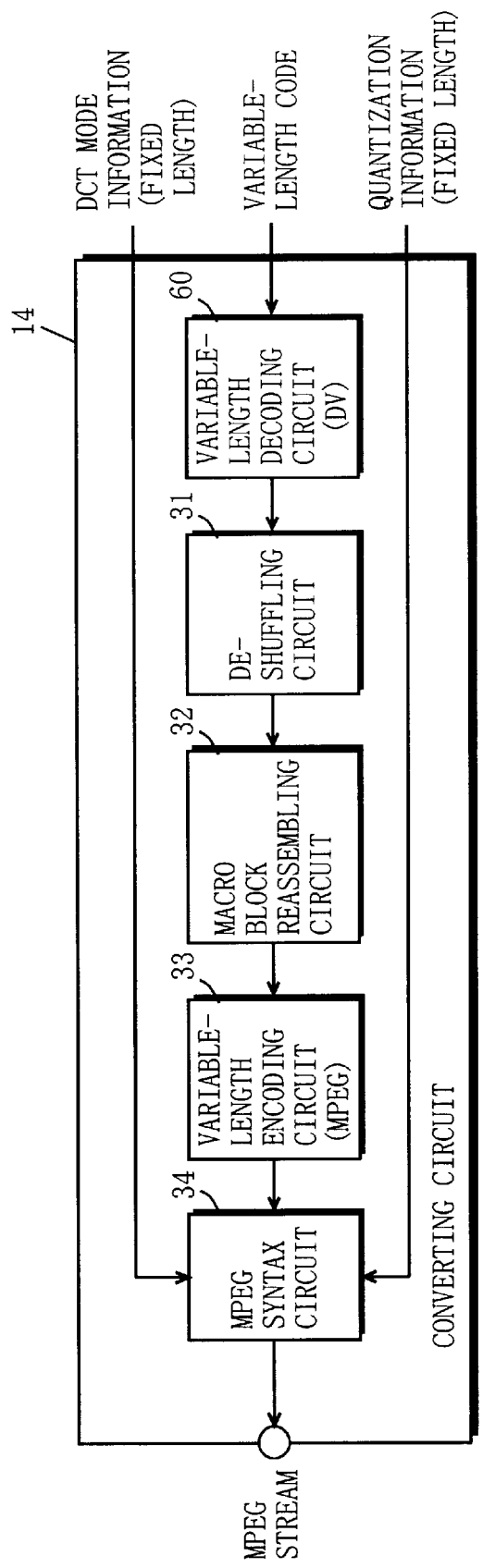

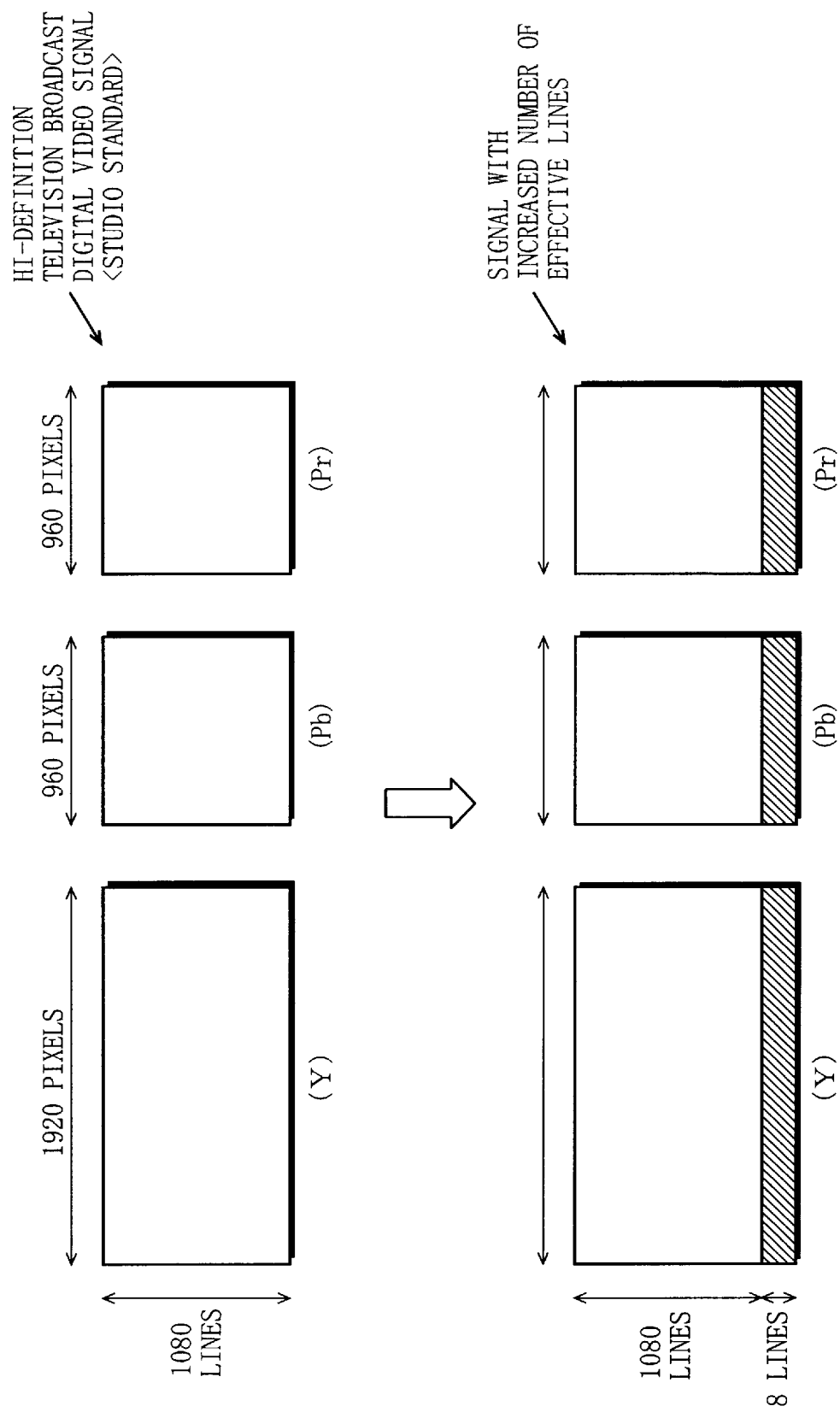

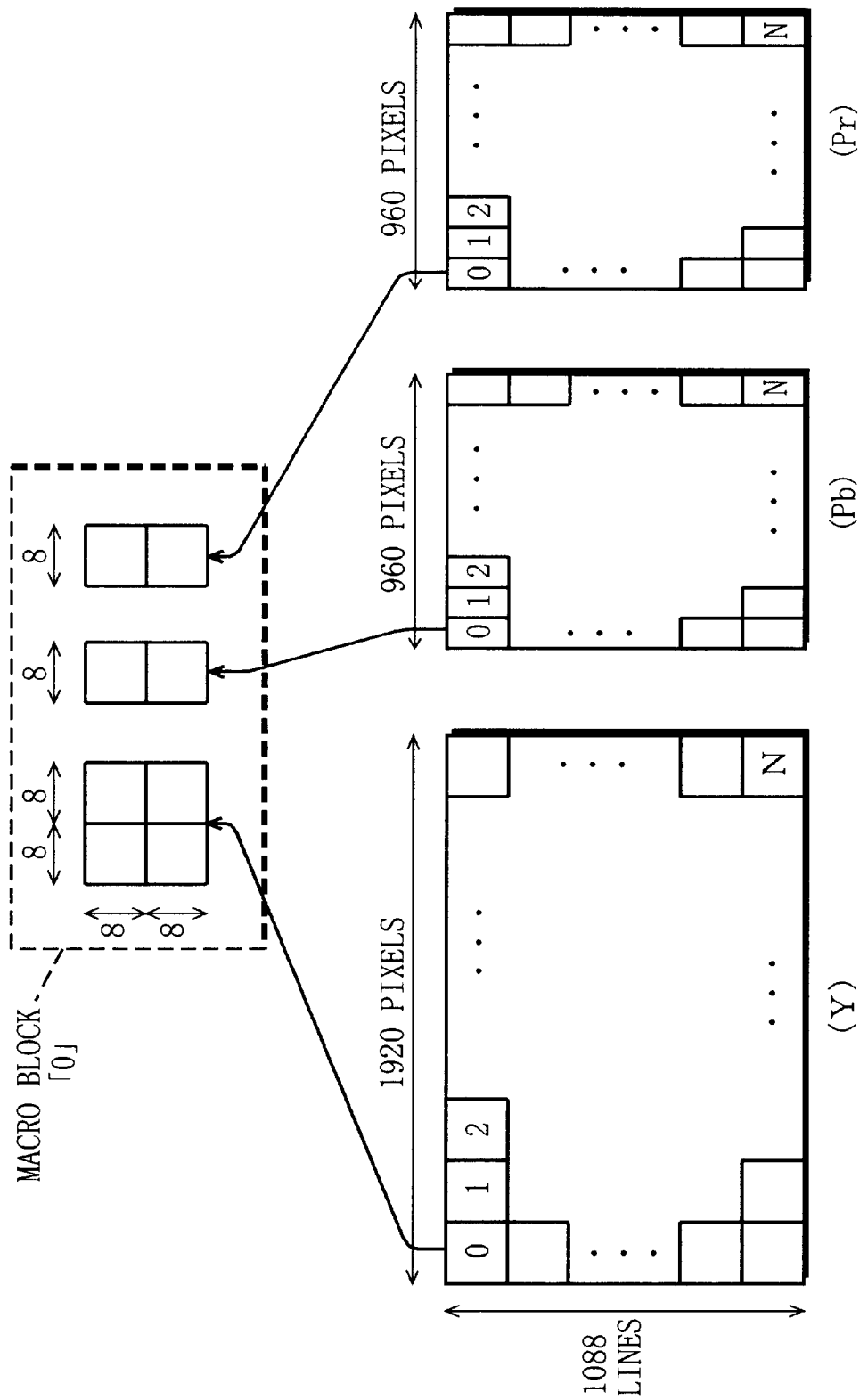

DIGITAL VIDEO SIGNAL RECORDER/REPRODUCER AND TRANSMITTER

TECHNICAL FIELD

The present invention relates to digital video signal recording and reproducing devices and transmission devices, and more particularly to a digital video signal recording and reproducing device which compresses a digital video signal and records it on a recording medium, and which reads the recorded signal and reproduces it, and to a digital video signal transmission device which compresses a digital video signal and transmits it through a transmission medium.

BACKGROUND ART

Recently, in the field of TV broadcasts, a video signal can be recorded or transmitted in digitized form. At present, the standard-definition television broadcasts mainly use a digital video signal with 480 effective lines and the high-definition television (HDTV) broadcasts mainly use a digital video signal with 1080 effective lines.

Conventional digital video signal recording and reproducing devices for recording and reproducing digital video signals include digital VCRs (Digital Video Cassette Recorders, as D3, D5, etc.), which adopt magnetic tapes (video casettes) as the recording medium. Recently, a standard about consumer-use digital VCRs using very small-sized video cassettes has been formulated (DV standard) and some new products based on the standard have been introduced.

While the DV standards were originally targeted at the standard-definition television broadcasts, they were expanded to the HDTV broadcast later. That is to say, the current DV standards define a compression/recording system about the digital video signal used in the standard-definition television broadcasts (hereinafter referred to as SD) and a compression/recording system for the digital video signal used in the HDTV broadcast (hereinafter referred to as HD).

In the case of SD, the image format of the digital video signal (which is referred to as SD format) uses 480 effective lines for both of luminance and color difference, 720 pixels of horizontal effective samples for luminance and 180 pixels for color difference (4:1:1). In the case of HD, the image format of the digital video signal (which is referred to as HD format) uses 1024 effective lines for luminance and 512 lines for color difference, and 1008 pixels of horizontal effective samples for luminance and 336 pixels for color difference (3:1:0).

A conventional digital video signal recording and reproducing device according to the DV standard <HD> is now described.

FIG. 19 is a block diagram showing the entire structure of the conventional digital video signal recording and reproducing device according to the DV standard <HD>.

In FIG. 19, the conventional digital video signal recording and reproducing device according to the DV standard (hereinafter referred to as conventional DV-VCR <HD>) has a compression circuit 170, a recording circuit 171, a recording medium 172, a reproducing circuit 173, and a decoding circuit 174.

It is assumed here that a digital video signal for HDTV broadcast <studio standard> is inputted to the conventional DV-VCR <HD>. Its image format uses 1080 effective lines for both of luminance and color difference, 1920 pixels of horizontal effective samples for luminance and 960 pixels for color difference (4:2:2). The recording medium 172 is a magnetic tape.

FIG. 20 is a block diagram showing the structure of the compression circuit 170 of FIG. 19.

In FIG. 20, the compression circuit 170 has a filter circuit 180, a macro block assembling circuit (DV) 181, a shuffling circuit 182, a DCT circuit (DV) 183, a quantization circuit (DV) 184, a zigzag scan circuit (DV) 185, a variable-length encoding circuit (DV) 186, a DCT mode decision circuit 187, and a code rate control circuit 188.

The character "(DV)" indicates a circuit which operates according to the DV standard (which applies hereinafter).

The filter circuit 180 converts the image format of the input digital video signal. The macro block assembling circuit (DV) 181 assembles macro blocks from the output signal of the filter circuit 180. The shuffling circuit 182 shuffles the output signal of the macro block assembling circuit (DV) 181. The DCT circuit (DV) 183 applies DCT (Discrete Cosine Transform) to the output signal of the shuffling circuit 182. The quantization circuit (DV) 184 quantizes the output signal of the DCT circuit (DV) 183. The zigzag scan circuit (DV) 185 zigzag-scans the output signal of the quantization circuit (DV) 184. The variable-length encoding circuit (DV) 186 variable-length encodes the output signal of the zigzag scan circuit (DV) 185.

The DCT mode decision circuit 187 decides whether the DCT should be the 8-8DCT or the 2-4-8DCT defined by the DV standard <HD>. The code rate control circuit 188 controls the code rate of the output of the quantization circuit (DV) 184.

Referring to FIG. 19 again, the recording circuit 171 records the output signal of the compression circuit 170 on the magnetic tape. In this process, the recording circuit 171 writes one frame in a region of a predetermined size (20 tracks).

The reproducing circuit 173 reproduces the digital video signal recorded on the magnetic tape.

FIG. 21 is a block diagram showing the structure of the decoding circuit 174 of FIG. 19.

In FIG. 21, the decoding circuit 174 has a variable-length decoding circuit (DV) 190, a zigzag scan circuit (DV) 191, an inverse quantization circuit (DV) 192, an inverse DCT circuit (DV) 193, a de-shuffling circuit 194, a reverse macro block assembling circuit (DV) 195, and a filter circuit 196.

The variable-length decoding circuit (DV) 190 variable-length decodes the output signal of the reproducing circuit 173. The zigzag scan circuit (DV) 191 zigzag-scans the output signal of the variable-length decoding circuit (DV) 190. The inverse quantization circuit (DV) 192 applies inverse quantization to the output signal of the zigzag scan circuit (DV) 191. The inverse DCT circuit (DV) 193 applies inverse DCT to the output signal of the inverse quantization circuit (DV) 192. The de-shuffling circuit 194 de-shuffles the output signal of the inverse DCT circuit (DV) 193. The reverse macro block assembling circuit (DV) 195 assembles a digital video signal from the output signal (macro blocks) of the de-shuffling circuit 194. The filter circuit 196 reversely converts the image format of the output signal of the reverse macro block assembling circuit (DV) 195.

Operation of this conventional DV-VCR <HD> is now described.

In FIG. 19, a digital video signal is inputted to the compression circuit 170.

In the compression circuit 170 of FIG. 20, first, the filter circuit 180 converts the image format of the input digital video signal from the HDTV broadcast <studio standard> to the DV standard <HD> (i.e. HD format). Next, the macro block assembling circuit (DV) 181 assembles macro blocks from the output signal of the filter circuit 180.

The operation of the macro block assembling circuit (DV) 181 is now described referring to FIG. 22.

FIG. 22 is a diagram in assistance of explaining the process in which the macro block assembling circuit (DV) 181 of FIG. 20 assembles macro blocks from the output signal of the filter circuit 180, i.e. from the digital video signal (HD format).

In FIG. 22, the digital video signal (HD format) is composed of a luminance signal (Y) with 1008 pixels*1024 lines and two color difference signals (Pb, Pr) with 336 pixels*512 lines.

The macro block assembling circuit (DV) 181 extracts 3*2=6 blocks as a unit from the luminance signal (i.e. adjacent 6 blocks including horizontal 3 blocks and vertical 2 blocks), where each block consisting of 8 pixels*8 lines. It also extracts one block composed of 8 pixels*8 lines from each of the two color difference signals. 8 blocks extracted as such are handled as one macro block (in the diagram, the macro block "0").

The macro block assembling circuit (DV) 181 thus assembles 2688 macro blocks from one frame of the digital video signal (HD format). 12 dummy macro blocks are added to each frame, and the macro block assembling circuit (DV) 181 thus outputs 2700 macro blocks per frame.

Next, Referring to FIG. 20 again, the shuffling circuit 182 shuffles the output signal of the macro block assembling circuit (DV) 181. FIG. 23 shows an example of an input to and an output from the shuffling circuit 182 of FIG. 20.

Next, the DCT mode decision circuit 187 refers to the output signal of the shuffling circuit 182 and decides, for each block, whether to apply 8-8DCT or 2-4-8DCT as DCT. It then informs the DCT circuit (DV) 183 of the result (DCT mode information). In response to the information, the DCT circuit (DV) 183 applies 8-8DCT or 2-4-8DCT to the output signal of the shuffling circuit 182.

Next, the code rate control circuit 188 estimates the code rate for every 5 macro blocks which will be outputted from the quantization circuit (DV) 184 on the basis of the output signal of the DCT circuit (DV) 183 and controls the code rate so that 5 macro blocks can be accommodated in 5 sync blocks (i.e. it gives quantization information for code rate control to the quantization circuit (DV) 184). In response, the quantization circuit (DV) 184 quantizes the output signal of the DCT circuit (DV) 183.

Next, the zigzag scan circuit (DV) 185 zigzag-scans the output signal of the quantization circuit (DV) 184. Next, the variable-length encoding circuit (DV) 186 variable-length encodes the output signal of the zigzag scan circuit (DV) 185.

The DCT mode information outputted from the DCT mode decision circuit 187 and the quantization information outputted from the code rate control circuit 188 are given to the recording circuit 171 together with the variable-length code outputted from the variable-length encoding circuit (DV) 186. The DCT mode information and the quantization information are of fixed length.

In FIG. 19, the recording circuit 171 records the output signal of the compression circuit 170 on the magnetic tape (the variable-length code, DCT mode information, and quantization information). In this process, the recording circuit 171 writes one frame of signal (2700 macro blocks) in a region of a predetermined size (20 tracks=2700 sync blocks).

The operation of this recording circuit 171 is now described referring to FIG. 24.

FIG. 24 is a diagram used to explain the operation of the recording circuit 171 of FIG. 19.

In FIG. 24, the recording circuit 171 receives the variable-length code (8 blocks) outputted from the variable-length encoding circuit (DV) 186, the DCT mode information outputted from the DCT mode decision circuit 187, and the quantization information outputted from the code rate control circuit 188; the recording circuit 171 receives 5 macro blocks as a unit (1 macro block=8 blocks).

When recording the variable-length code, DCT mode information and quantization information on the magnetic tape, the recording circuit 171 records 5 macro blocks in 5 synch blocks.

That is to say, a synch block consists of a region for storing the quantization information (1 byte) and a region for storing the DCT mode information and variable-length code (76 bytes). The latter region is divided into a total of 8 regions including six 10-byte regions for luminance blocks and two 8-byte regions for color difference blocks. As shown in FIG. 8 ①  to ③, the recording circuit 171 first stores the quantization information and the DCT mode information in the sync block (①) and next stores the variable-length code.

When storing the variable-length code, the recording circuit 171 stores 8 blocks forming 1 macro block respectively into the 8 regions mentioned above. In this process, for luminance blocks exceeding 10 bytes and color difference blocks exceeding 8 bytes, the 10 bytes or 8 bytes are stored first (②). The remainders are sequentially stored in blanks in regions where a luminance block smaller than 10 bytes or a color difference block smaller than 8 bytes was stored (③).

The processes ① to ③ are performed for each macro block. In this process, some macro blocks may be left unstored in the sync blocks or some sync blocks may be left unfilled. Accordingly, after repeating the processes ① to ③ five times, the recording circuit 171 sequentially stores the parts of the 5 macro blocks which are left unstored into blanks in other sync blocks (④).

Referring to FIG. 19 again, the reproducing circuit 173 reproduces the digital video signal recorded on the magnetic tape. The output signal of the reproducing circuit 173 (the variable-length code, DCT mode information, and quantization information) is inputted to the decoding circuit 174.

In the decoding circuit 174 of FIG. 21, first, the variable-length decoding circuit (DV) 190 variable-length decodes the output signal of the reproducing circuit 173 (the variable-length code). Next, the zigzag scan circuit (DV) 191 zigzag-scans the output signal of the variable-length decoding circuit (DV) 190. Next, the inverse quantization circuit (DV) 192 applies inverse quantization to the output signal of the zigzag scan circuit (DV) 191 on the basis of the output signal of the reproducing circuit 173 (the quantization information). Next, the inverse DCT circuit (DV) 193 applies inverse DCT to the output signal of the inverse quantization circuit (DV) 192 on the basis of the output signal of the reproducing circuit 173 (the DCT mode information). Next, the de-shuffling circuit 194 de-shuffles the output signal of the inverse DCT circuit (DV) 193.

Next, the reverse macro block assembling circuit (DV) 195 assembles a digital video signal from the output signal (macro blocks) of the de-shuffling circuit 194. That is to say, it performs operation reverse to that performed by the macro block assembling circuit (DV) 181 on the recording side.

More specifically, in FIG. 22, it assembles a digital video signal (HD format) composed of a luminance signal (Y) with 1008 pixels*1024 lines and two color difference signals (Pb, Pr) with 336 pixels*512 lines from the macro blocks given from the de-shuffling circuit 194.

Next, the filter circuit 196 reversely converts the image format of the output signal of the reverse macro block assembling circuit (DV) 195 from HD to HDTV broadcast <studio standard>.

As described above, the conventional DV-VCR <HD> converts the image format of a digital video signal for HDTV broadcasting <studio standard> into HD format and then compresses, records and reproduces the signal according to the DV standard <HD>.

Another conventional digital video signal recording and reproducing device according to the DV standard <SD> (hereinafter referred to as conventional DV-VCR <SD>; not shown) for recording and reproducing a digital video signal for the standard-definition television broadcasts has a similar structure to that shown in FIG. 19.

The conventional DV-VCR <SD> operates in basically the same way as the conventional DV-VCR <HD> described above. However, due to the difference in image format, the process for assembling macro blocks differs from that of the conventional DV-VCR <HD>. Hence, the process of assembling macro blocks from a digital video signal based on the standard-definition television broadcasts (SD format) is now described.

FIG. 25 is a diagram used to explain the process in which a macro block assembling circuit (not shown) in the conventional digital video signal recording and reproducing device based on the DV standard <SD> (conventional DV-VCR <SD>) assembles macro blocks from a digital video signal (SD format).

In FIG. 25, the digital video signal (SD format) is composed of a luminance signal (Y) with 720 pixels*480 lines and two color difference signals (Pb, Pr) with 180 pixels*480 lines.

The macro block assembling circuit first divides the luminance signal into 704 pixels on the left and 16 pixels on the right and divides each color difference signal into 176 pixels on the left and 4 pixels on the right.

Next, the macro block assembling circuit applies the following processing to the left 704 pixels of the luminance signal and the left 176 pixels of the color difference signals. That is to say, it extracts 4*1=4 blocks as a unit from the luminance signal, where each block consisting of 8 pixels*8 lines. It also extracts one block of 8 pixels*8 lines from each of the two color difference signals. The extracted 6 blocks are handled as one macro block (in the drawing the macro block "0").

Next, the macro block assembling circuit applies the following processing to the right 16 pixels of the luminance signal and the right 4 pixels of the color difference signals. That is to say, it extracts 2*2=4 blocks as a unit from the luminance signal, where each block consisting of 8 pixels*8 lines. It also extracts one block consisting of 4 pixels*16 lines from each of the two color difference signals. The extracted 6 blocks are handled as one macro block (in the drawing the macro block "N").

Accordingly, in the conventional DV-VCR <SD>, the macro block assembling circuit assembles 1350 macro blocks from one frame of the digital video signal (SD format).

In this process, the recording circuit provided in the conventional DV-VCR <SD> writes one frame of signal (1350 macro blocks) in 10 tracks (=1350 sync blocks). Aside from the difference in recording rate, the operation of the recording circuit in the DV-VCR <SD> is the same as that of the recording circuit 171 in the DV-VCR <HD> (see FIG. 24).

By the way, widespread digital video signal compression systems include the MPEG system as well as the DV system, and some broadcasting devices are hence constructed to directly receive an MPEG stream as input (e.g. equipment for CS broadcasts etc.). Accordingly there is a demand for digital video signal recording and reproducing devices in which the reproducing side can extract not only a digital video signal but also an MPEG stream. However such devices are not conventionally available.

The method below may be employed to realize a digital video signal recording and reproducing device which can extract an MPEG stream on the reproducing side. This method uses the above-described DV-VCR and an existing MPEG encoder. This method is now described referring to FIG. 26.

FIG. 26 is a block diagram showing the whole structure of the digital video signal recording and reproducing device which can extract an MPEG stream on the reproducing side; it uses the DV-VCR of FIG. 19 and the existing MPEG encoder.

In FIG. 26, the digital video signal recording and reproducing device which can extract an MPEG stream on the reproducing side (which is referred to as conventional digital video signal recording and reproducing device hereinafter) has the DV-VCR and MPEG encoder.

It is assumed here that a digital video signal for HDTV broadcast <studio standard> is inputted to the conventional digital video signal recording and reproducing device. The recording medium 172 is a magnetic tape.

The DV-VCR is the same as that shown in FIG. 19. The MPEG encoder includes a compression circuit 240.

FIG. 27 is a block diagram showing the structure of the compression circuit 240 of FIG. 26 (that in the MPEG encoder).

In FIG. 27, the compression circuit 240 has a macro block assembling circuit (MPEG) 250, a DCT circuit (MPEG) 251, a quantization circuit (MPEG) 252, a zigzag scan circuit (MPEG) 253, a variable-length encoding circuit (MPEG) 254, an MPEG syntax circuit 255, a DCT mode decision circuit 256, and a code rate control circuit 257.

The character "(MPEG)" indicates a circuit which operates according to the MPEG standard (the same applies hereinafter).

The macro block assembling circuit (MPEG) 250 assembles macro blocks from the output signal of the DV-VCR. The DCT circuit (MPEG) 251 applies DCT to the output signal of the macro block assembling circuit (MPEG) 250. The quantization circuit (MPEG) 252 quantizes the output signal of the DCT circuit (MPEG) 251. The zigzag scan circuit (MPEG) 253 zigzag-scans the output signal of the quantization circuit (MPEG) 252. The variable-length encoding circuit (MPEG) 254 variable-length encodes the output signal of the zigzag scan circuit (MPEG) 253. The MPEG syntax circuit 255 converts the output signal of the variable-length encoding circuit (MPEG) 254 into a stream based on the MPEG syntax. The DCT mode decision circuit 256 decides whether to perform frame DCT or field DCT defined by the MPEG standard. The code rate control circuit 257 controls the code rate outputted from the quantization circuit (MPEG) 252.

Operation of this conventional digital video signal recording and reproducing device is now described.

In FIG. 26, first, a digital video signal is inputted to the DV-VCR. The DV-VCR compresses the input signal and records it on the recording medium 172, and then reproduces and decodes the signal recorded on the recording medium 172 to output a digital video signal. This output signal is inputted to the MPEG encoder.

In the compression circuit 240 of the MPEG encoder shown in FIG. 27, first, the macro block assembling circuit (MPEG) 250 assembles macro blocks from the output signal of the DV-VCR. The DCT mode decision circuit 256 refers to the output signal of the macro block assembling circuit (MPEG) 250 to decide for each macro block whether to perform frame DCT or field DCT defined by the MPEG standard and informs the DCT circuit (MPEG) 251 of the result (DCT mode information). According to the information, the DCT circuit (MPEG) 251 applies frame DCT or field DCT to the output signal of the macro block assembling circuit (MPEG) 250.

Next, the code rate control circuit 257 estimates the code rate of the MPEG stream output (from the compression circuit 240) on the basis of the output signal of the DCT circuit (MPEG) 251 and controls the code rate so that the MPEG stream falls within a given code rate (that is to say, it gives quantization information for the code rate control to the quantization circuit (MPEG) 252). In response, the quantization circuit (MPEG) 252 quantizes the output signal of the DCT circuit (MPEG) 251. Next, the zigzag scan circuit (MPEG) 253 zigzag-scans the output signal of the quantization circuit (MPEG) 252. Next the variable-length encoding circuit (MPEG) 254 variable-length encodes the output signal of the zigzag scan circuit (MPEG) 253. Next the MPEG syntax circuit 255 converts the output signal of the variable-length encoding circuit (MPEG) 254, the output signal of the DCT mode decision circuit (DCT mode information), and the output signal of the code rate control circuit (quantization information) into a stream based on the MPEG syntax.

In this way, in the conventional digital video signal recording and reproducing device including an MPEG encoder connected to the DV-VCR, the output signal of the DV-VCR, i.e., a digital video signal once DV compressed and recorded and then reproduced and decoded, is MPEG compressed through the MPEG encoder, thereby an MPEG stream is obtained on the reproducing side.

As another method, it is supposed that an MPEG stream can be extracted on the reproducing side by compressing a digital video signal by MPEG in the first step and recording it on a magnetic tape.

However, as for the device of FIG. 26, its circuit configuration must be complex and the quality of the image obtained from the extracted MPEG stream will be considerably deteriorated, since it performs the MPEG compression after DV compression and decoding.

In addition, it is difficult to convert a DV stream (i.e. the output signal of the reproducing circuit 173) directly into an MPEG stream without once decoding it, since the DV standard (whether SD or HD) and the MPEG standard adopt different image formats.

For the image formats, the DV standard uses (4:1:1) for SD and (3:1:0) for HD. The MPEG standard uses (4:4:4), (4:2:2), or (4:2:0) (the above-described MPEG encoder adopts (4:2:2)).

On the other hand, a device which compresses a digital video signal by MPEG and records it has the following problem. In MPEG compression, the redundancy of the signal may be increased depending on the number of effective lines of the digital video signal (that is, the encoding efficiency is reduced), which results in wasteful consumption of the capacity of the recording medium 172.

This increase in redundancy occurs when assembling macro blocks according to the MPEG standard from a digital video signal in which the number of effective lines is not a multiple of 16. Such case is now exemplarily described referring to FIGS. 28 and 29. In the example, macro blocks are assembled according to the MPEG standard from a digital video signal for HDTV broadcast <studio standard> with 1080 effective lines.

FIGS. 28 and 29 are diagrams used to explain the process for assembling macro blocks according to the MPEG standard from an HDTV broadcast digital video signal <studio standard>.

In FIGS. 28 and 29, the digital video signal is an HDTV broadcast <studio standard> signal composed of a luminance signal (Y) with 1920 pixels*1080 lines and two color difference signals (Pb, Pr) with 960 pixels*1080 lines. In the luminance signal and the two color difference signals, 8 pixels*8 lines form one block.

First, as shown in FIG. 28, the number of effective lines of the digital video signal is increased from 1080 lines to 1088 lines. That is to say, dummy blocks of 8 lines are added to (the screen bottoms of) the luminance signal and the two color difference signals (i.e. 240*1 dummy blocks are added to the luminance signal and 120*1 to each of the two color difference signals).

Next, as shown in FIG. 29, macro blocks are assembled from the digital video signal having the increased effective lines (1088 effective lines). That is to say, 2*2=4 blocks are extracted as a unit from the enlarged luminance signal and 1*2=2 blocks from each of the two enlarged color difference signals, where the extracted 8 blocks are handled as one macro block (in the drawing the macro block "0").

In this way, when assembling macro blocks according to the MPEG standard from a digital video signal in which the number of effective lines is not a multiple of 16, the number of effective lines is increased to a multiple of 16, i.e. an appropriate number of dummy blocks are added to the signal. These dummy blocks increase the signal redundancy.

The problem above also exists in digital video signal transmission devices which compress a digital video signal and transmit it through a transmission medium so that the receiving end can extract an MPEG stream.

That is to say, when a digital video signal is DV-compressed and transmitted, and the receiving end decompresses it and compresses it again by MPEG, complex processing circuitry is required and the image quality is considerably deteriorated. On the other hand, when a digital video signal is compressed by MPEG in the first step and transmitted, the signal redundancy is increased depending on the number of effective lines to wastefully consume the band of the transmission medium.

Accordingly, an object of the present invention is to provide a digital video signal recording and reproducing device in which, when recording and reproducing a digital video signal in which the number of effective lines is not a multiple of 16, the reproducing side can extract an MPEG stream with a simple structure and without suffering noticeable image quality deterioration, and without wastefully consuming the capacity of the recording medium.

Another object of the present invention is to provide a digital video signal transmission device in which, when transmitting a digital video signal in which the number of effective lines is not a multiple of 16, the receiving end can extract an MPEG stream with a simple structure and without suffering noticeable image quality deterioration, and without wastefully consuming the band of the transmitting medium.

DISCLOSURE OF THE INVENTION

The present invention has the following features to solve the problems described above.

A first aspect of the present invention is directed to a digital video signal recording device for recording a digital video signal in which the remainder left when the number of its effective lines is divided by 16 is not less than 1 and not more than 8, the device comprising:

compressing means for compressing the digital video signal according to a procedure which partially differs from an MPEG standard; and recording means for recording an output signal of the compressing means on a recording medium, the compressing means comprising, macro block assembling means for adding dummy lines of 7 lines maximum to the effective lines of the digital video signal and assembling macro blocks with 16 lines and macro blocks with 8 lines, and DCT means for applying field DCT (Discrete Cosine Transform; which applies hereinafter) or frame DCT defined by the MPEG standard to the macro blocks with 16 lines and applying only the frame DCT defined by the MPEG standard to the macro blocks with 8 lines.

In accordance with the first aspect (and the second aspect below), in the process of compression, dummy lines of 7 lines maximum are added to a digital video signal in which the remainder left when the number of effective lines is divided by 16 is between 1 and 8 so that the remainder becomes 8 (note that no dummy line is added when the 16's remainder of the number of effective lines is 8, e.g. when the number of effective lines is 1080), and macro blocks with 16 lines and macro blocks with 8 lines are assembled. The macro blocks with 8 lines are subjected only to the frame DCT defined by the MPEG standard. Accordingly, when reproducing the signal recorded on the recording medium and converting it into an MPEG stream, the macro blocks can be reassembled into those equivalent to macro blocks obtained by performing the process of increasing the number of lines as defined by the MPEG standard just by adding dummy blocks with 8 lines to the 8-line macro blocks.

Recording the digital video signal in this way eliminates the need to record dummy blocks with 8 lines on the recording medium (that is to say, as compared with a process of recording macro blocks equivalent to those obtained by performing the process of increasing the number of lines defined by the MPEG standard, the capacity of the recording medium corresponding to dummy blocks with 8 lines can be saved). Furthermore, in the process of reproduction, the macro blocks can be reassembled into macro blocks equivalent to those obtained by performing the process of increasing the number of lines defined by the MPEG standard just by adding dummy blocks with 8 lines, without the need to once convert the 8-line macro blocks into the digital video signal (that is, this saves the process of once converting the 8-line macro blocks back into the digital video signal and also alleviates the deterioration of the image quality).

Thus, the reproducing side can extract an MPEG stream with a simple structure and without causing noticeable deterioration of the image quality, and without wastefully consuming the capacity of the recording medium.

A second aspect is directed to a digital video signal recording and reproducing device for recording and reproducing a digital video signal in which the remainder left when the number of its effective lines is divided by 16 is not less than 1 and not more than 8, the device comprising:

compressing means for compressing the digital video signal according to a procedure which partially differs from an MPEG standard;

recording means for recording an output signal of the compressing means on a recording medium;

reproducing means for reproducing the signal recorded on the recording medium; and converting means for converting an output signal of the reproducing means into an MPEG stream, the compressing means comprising, macro block assembling means for adding dummy lines of 7 lines maximum to the effective lines of the digital video signal and assembling macro blocks with 16 lines and macro blocks with 8 lines, and DCT means for applying field DCT (Discrete Cosine Transform; which applies hereinafter) or frame DCT defined by the MPEG standard to the macro blocks with 16 lines and applying only the frame DCT defined by the MPEG standard to the macro blocks with 8 lines, and the converting means comprising macro block reassembling means for reassembling the macro blocks assembled by the macro block assembling means into macro blocks which are equivalent to those obtained by performing a process of increasing the number of effective lines as defined by the MPEG standard.

According to a third aspect, in the second aspect, the process of increasing the number of effective lines is a process of, when assembling macro blocks, adding dummy blocks to a digital video signal in which the number of effective lines is not a multiple of 16 to make the number of effective lines a multiple of 16, and the macro block reassembling means adds dummy blocks with 8 lines to the macro blocks assembled by the macro block assembling means to reassemble the macro blocks equivalent to those obtained by performing the process of increasing the number of lines.

According to a fourth aspect, in the second aspect, the compressing means further comprises, encoding means for quantizing and variable-length encoding an output signal of the DCT means according to the procedure which partially differs from the MPEG standard, and code rate control means for generating quantization information for controlling the code rate of the macro blocks assembled by the macro block assembling means so that N (N is an arbitrary natural number; which applies thereinafter) of the macro blocks can be exactly, without any remainder nor shortage stored in N fixed-length sync blocks, and the recording means records the output signal of the compressing means on the recording medium in such a manner that one frame of the output signal is stored in a given number of fixed-length sync blocks on the recording medium.

According to a fifth aspect, in the second aspect,
the compressing means further comprises,
quantization means for quantizing an output signal of the DCT means according to the MPEG standard,
variable-length encoding means for variable-length encoding an output signal of the quantization means according to the MPEG standard, and
code rate control means for generating quantization information for controlling the code rate of the macro blocks assembled by the macro block assembling means so that N (N is an arbitrary natural number; which applies thereinafter) of the macro blocks can be exactly, without any remainder nor shortage, stored in N fixed-length sync blocks,
the converting means further comprises variable-length decoding means for variable-length decoding an output signal of the variable-length encoding means according to the MPEG standard and outputting a signal obtained by this process to the macro block reassembling means, and
the code rate control means generates the quantization information on the basis of the output signal of the DCT means and provides the quantization information to the quantization means.

According to a sixth aspect, in the second aspect,
the compressing means further comprises,
quantization means for quantizing an output signal of the DCT means according to the MPEG standard,
DV variable-length encoding means for variable-length encoding an output signal of the quantization means according to a DV standard, and
code rate control means for generating quantization information for controlling the code rate of the macro blocks assembled by the macro block assembling means so that N (N is an arbitrary natural number; which applies thereinafter) of the macro blocks can be exactly, without any remainder nor shortage, stored in N fixed-length sync blocks,
the converting means further comprises,
DV variable-length decoding means for variable-length decoding an output signal of the DV variable-length encoding means according to the DV standard and outputting a signal obtained by this process to the macro block reassembling means, and
MPEG variable-length encoding means for variable-length encoding an output signal of the macro block reassembling means according to the MPEG standard, and
the code rate control means generates the quantization information on the basis of the output signal of the DCT means and provides the quantization information to the quantization means.

In accordance with the sixth aspect, the device performs DV variable-length encoding in the process of compression; in the process of conversion, it once performs DV variable-length decoding and then performs MPEG variable-length encoding.

According to a seventh aspect, in the sixth aspect,
the compressing means further comprises filter means for converting the format of the digital video signal into a format in which the number of effective lines is 1080 lines for both of luminance and color difference and the number of horizontal effective samples is 1280 pixels for luminance and 640 pixels for color difference,
the macro block assembling means assembles 5400 macro blocks per frame from the digital video signal of the converted format without performing the process of increasing the number of effective lines, and
the recording means records the output signal of the compressing means on the recording medium in such a manner that one frame of the output signal is stored in 5400 fixed-length sync blocks on the recording medium.

In accordance with the seventh aspect, the format of the digital video signal is converted as stated above so that existing DV recording circuits can be used as the recording medium. This reduces the cost of the development of the digital video signal recording and reproducing device.

According to an eighth aspect, in the seventh aspect,
the recording means comprises,
four DV recording circuits provided in parallel each recording an input signal on the recording medium in such a manner that one frame of the input signal is stored in 1350 fixed-length sync blocks on the recording medium, and
distributing means for evenly distributing and outputting the output signal of the compressing means to the four DV recording circuits.

According to a ninth aspect, in the seventh aspect,
the recording means comprises,
two DV recording circuits provided in parallel each recording an input signal on the recording medium in such a manner that one frame of the input signal is stored in 2700 fixed-length sync blocks on the recording medium, and
distributing means for evenly distributing and outputting the output signal of the compressing means to the two DV recording circuits.

According to a tenth aspect, in the seventh aspect,
the digital video signal has a format in which the number of effective lines is 1080 lines for both of luminance and color difference and the number of horizontal effective samples is 1920 pixels for luminance and 960 pixels for color difference.

According to an eleventh aspect, in the second aspect,
the digital video signal recording and reproducing device further comprises decoding means for decoding the output signal of the reproducing means, wherein
the decoding means comprises reverse macro block assembling means for reversely assembling a signal equivalent to the digital video signal from the macro blocks assembled by the macro block assembling means.

In accordance with the eleventh aspect, the reproducing side can extract not only an MPEG stream but also a digital video signal.

According to a twelfth aspect, in the eleventh aspect,
the process of increasing the number of effective lines is a process of, when assembling macro blocks, adding a dummy line or dummy lines to a digital video signal in which the number of its effective lines is not a multiple of 16 to make the number of effective lines a multiple of 16,
the macro block reassembling means reassembles the macro blocks equivalent to those obtained by performing the process of increasing the number of lines by adding dummy blocks with 8 lines to the macro blocks assembled by the macro block assembling means, and
the reverse macro block assembling means reversely assembles the signal equivalent to the digital video signal by removing the dummy lines of 7 lines maximum from the macro blocks assembled by the macro block assembling means.

According to a thirteenth aspect, in the eleventh aspect,
the compressing means further comprises,
quantization means for quantizing an output signal of the DCT means according to the MPEG standard,
variable-length encoding means for variable-length encoding an output signal of the quantization means according to the MPEG standard, and
code rate control means for generating quantization information for controlling the code rate of the macro blocks assembled by the macro block assembling means so that N (N is an arbitrary natural number; which applies thereinafter) of the macro blocks can be exactly, without any remainder nor shortage, stored in N fixed-length sync blocks,
the converting means further comprises variable-length decoding means for variable-length decoding the output signal of the reproducing means according to the MPEG standard and outputting a signal obtained by this process to the macro block reassembling means and the decoding means,
the decoding means further comprises,
inverse quantization means for inversely quantizing the output signal of the variable-length decoding means according to the MPEG standard, and
inverse DCT means for applying inverse DCT to an output signal of the inverse quantization means according to the MPEG standard and outputting a signal obtained by this process to the reverse macro block assembling means, and
the code rate control means generates the quantization information on the basis of the output signal of the DCT means and provides the quantization information to the quantization means.

According to a fourteenth aspect, in the eleventh aspect,
the compressing means further comprises,
quantization means for quantizing an output signal of the DCT means according to the MPEG standard,
DV variable-length encoding means for variable-length encoding an output signal of the quantization means according to a DV standard, and
code rate control means for generating quantization information for controlling the code rate of the macro blocks assembled by the macro block assembling means so that N (N is an arbitrary natural number; which applies thereinafter) of the macro blocks can be exactly, without any reminder nor shortage, stored in N fixed-length sync blocks,
the converting means further comprises,
DV variable-length decoding means for variable-length decoding the output signal of the reproducing means according to the DV standard and outputting a signal obtained by this process to the macro block reassembling means and the decoding means, and
MPEG variable-length encoding means for variable-length encoding the output signal of the DV variable-length decoding means according to the MPEG standard,
the decoding means further comprises,
inverse quantization means for inversely quantizing the output signal of the DV variable-length decoding means according to the MPEG standard, and
inverse DCT means for applying inverse DCT to an output signal of the inverse quantization means according to the MPEG standard and outputting a signal obtained by this process to the reverse macro block assembling means, and the code rate control means generates the quantization information on the basis of the output signal of the DCT means and provides the quantization information to the quantization means.

In accordance with the fourteenth aspect, the device performs DV variable-length encoding in the process of compression; in the process of conversion, it once performs DV variable-length decoding and then performs MPEG variable-length encoding.

According to a fifteenth aspect, in the fourteenth aspect,
the compressing means further comprises first filter means for converting the format of the digital video signal into a format in which the number of effective lines is 1080 lines for both of luminance and color difference and the number of horizontal effective samples is 1280 pixels for luminance and 640 pixels for color difference,
the macro block assembling means assembles 5400 macro blocks per frame from the digital video signal of the converted format without performing the process of increasing the number of effective lines,
the recording means records the output signal of the compressing means on the recording medium in such a manner that one frame of the signal is stored in 5400 fixed-length sync blocks on the recording medium, and
and wherein the decoding means further comprises second filter means for converting the format of an output signal of the reverse macro block assembling means into a format equivalent to that of the digital video signal.

In accordance with the fifteenth aspect, the format of the digital video signal is converted as explained above so that existing DV recording circuits can be used as the recording means. This reduces the cost of the development of the digital video signal recording and reproducing device.

According to a sixteenth aspect, in the fifteenth aspect,
the recording means comprises,
four DV recording circuits provided in parallel each recording an input signal on the recording medium in such a manner that one frame of the input signal is stored in 1350 fixed-length sync blocks on the recording medium, and
distributing means for evenly distributing and outputting the output signal of the compressing means to the four DV recording circuits.

According to a seventeenth aspect, in the fifteenth aspect,
the recording means comprises,
two DV recording circuits provided in parallel each recording an input signal on the recording medium in such a manner that one frame of the input signal is stored in 2700 fixed-length sync blocks on the recording medium, and
distributing means for evenly distributing and outputting the output signal of the compressing means to the two DV recording circuits.

According to an eighteenth aspect, in the fifteenth aspect, the digital video signal has a format in which the number of effective lines is 1080 lines for both of luminance and color difference and the number of horizontal effective samples is 1920 pixels for luminance and 960 pixels for color difference.

A nineteenth aspect is directed to a digital video signal transmission device for transmitting a digital video signal in which the remainder left when the number of its effective lines is divided by 16 is not less than 1 and not more than 8, the device comprising:
compressing means for compressing the digital video signal according to a procedure which partially differs from MPEG;

transmitting means for transmitting an output signal of the compressing means through a transmission medium in such a manner that one frame of the output signal is stored in a given number of fixed-length packets on the transmission medium; and converting means for converting a signal transmitted through the transmission medium into an MPEG stream, the compressing means comprising, macro block assembling means for adding dummy lines of 7 lines maximum to the effective lines of the digital video signal and assembling macro blocks with 16 lines and macro blocks with 8 lines, and DCT means for applying field DCT (Discrete Cosine Transform; which applies hereinafter) or frame DCT defined by the MPEG standard to the macro blocks with 16 lines and applying only the frame DCT defined by the MPEG standard to the macro blocks with 8 lines, and the converting means comprising macro block reassembling means for reassembling the macro blocks assembled by the macro block assembling means into macro blocks which are equivalent to those obtained by performing the process of increasing the number of effective lines as defined by the MPEG standard.

BRIEF DESCRIPTION OF THE DRAWINGS

FIG. 4 is a diagram used to explain a process in which the macro block assembling circuit (semi-MPEG) 20 of FIG. 2 assembles macro blocks from an input digital video signal (HDTV broadcast <studio standard>).

FIG. 7 is a block diagram showing the structure of the converting circuit 14 of FIG. 1 (second embodiment).

FIG. 28 is a diagram used to explain the process of assembling macro blocks from an HDTV broadcasting digital video signal <studio standard> according to the MPEG standard (a process of increasing the number of effective lines).

FIG. 29 is a diagram used to explain the process of assembling macro blocks from an HDTV broadcasting digital video signal <studio standard> according to the MPEG standard (a process of assembling macro blocks from a signal obtained through the process of increasing the number of effective lines shown in FIG. 28).

BEST MODE FOR CARRYING OUT THE INVENTION

Figure 1:
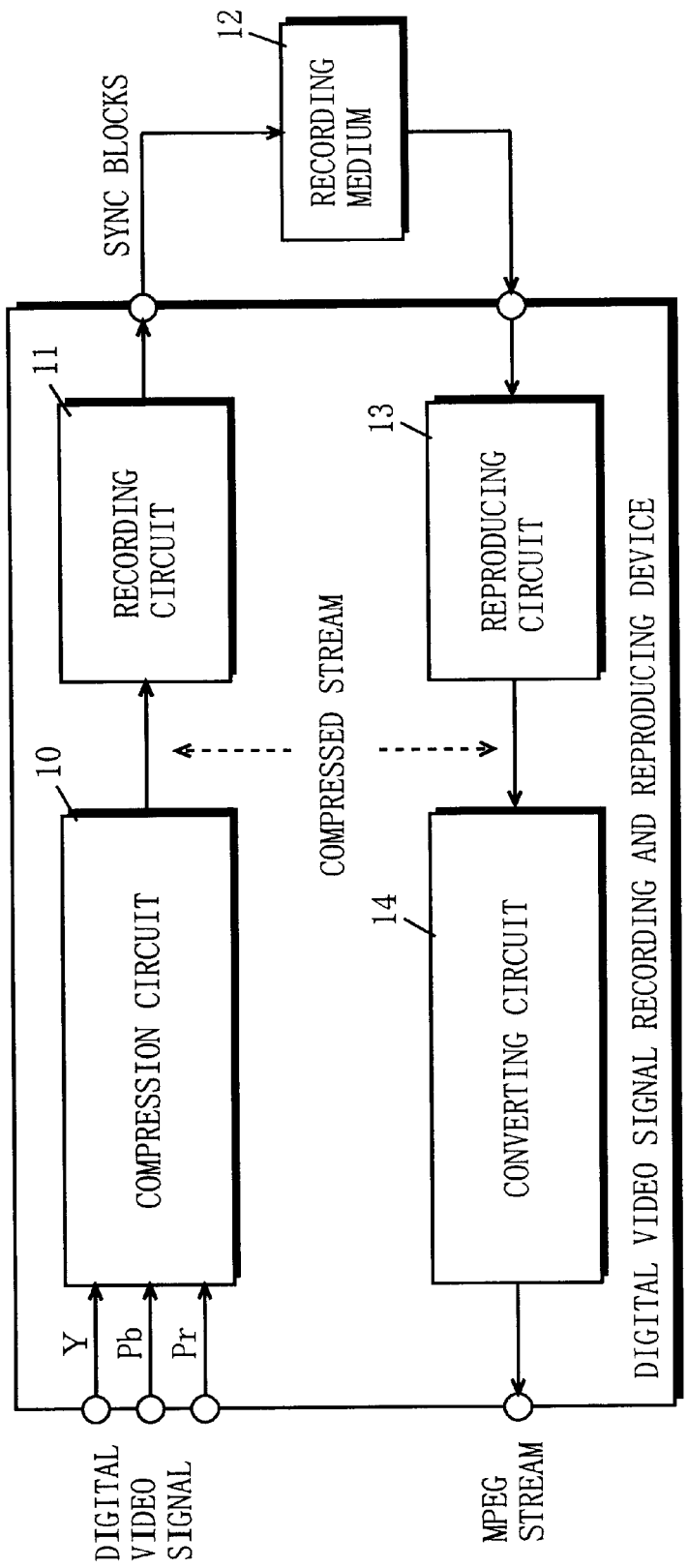
FIG. 1 is a block diagram showing the entire structure of a digital video signal recording and reproducing device according to a first embodiment of the present invention (this diagram is referred to also in the second embodiment).

Embodiments of the present invention will now be described referring to the drawings.

(First Embodiment)

FIG. 1 is a block diagram showing the entire structure of a digital video signal recording and reproducing device according to a first embodiment of the present invention.

In FIG. 1, the digital video signal recording and reproducing device according to the first embodiment of the present invention (hereinafter referred to as a digital video signal recording and reproducing device) has a compression circuit 10, a recording circuit 11, a recording medium 12, a reproducing circuit 13, and a converting circuit 14.

It is assumed here that a digital video signal for HDTV broadcast <studio standard> is inputted to the digital video signal recording and reproducing device. Its image format uses 1080 effective lines for both of luminance and color difference, 1920 pixels of horizontal effective samples for luminance and 960 pixels for color difference (4:2:2). The recording medium 12 is a magnetic tape.

Figure 2:
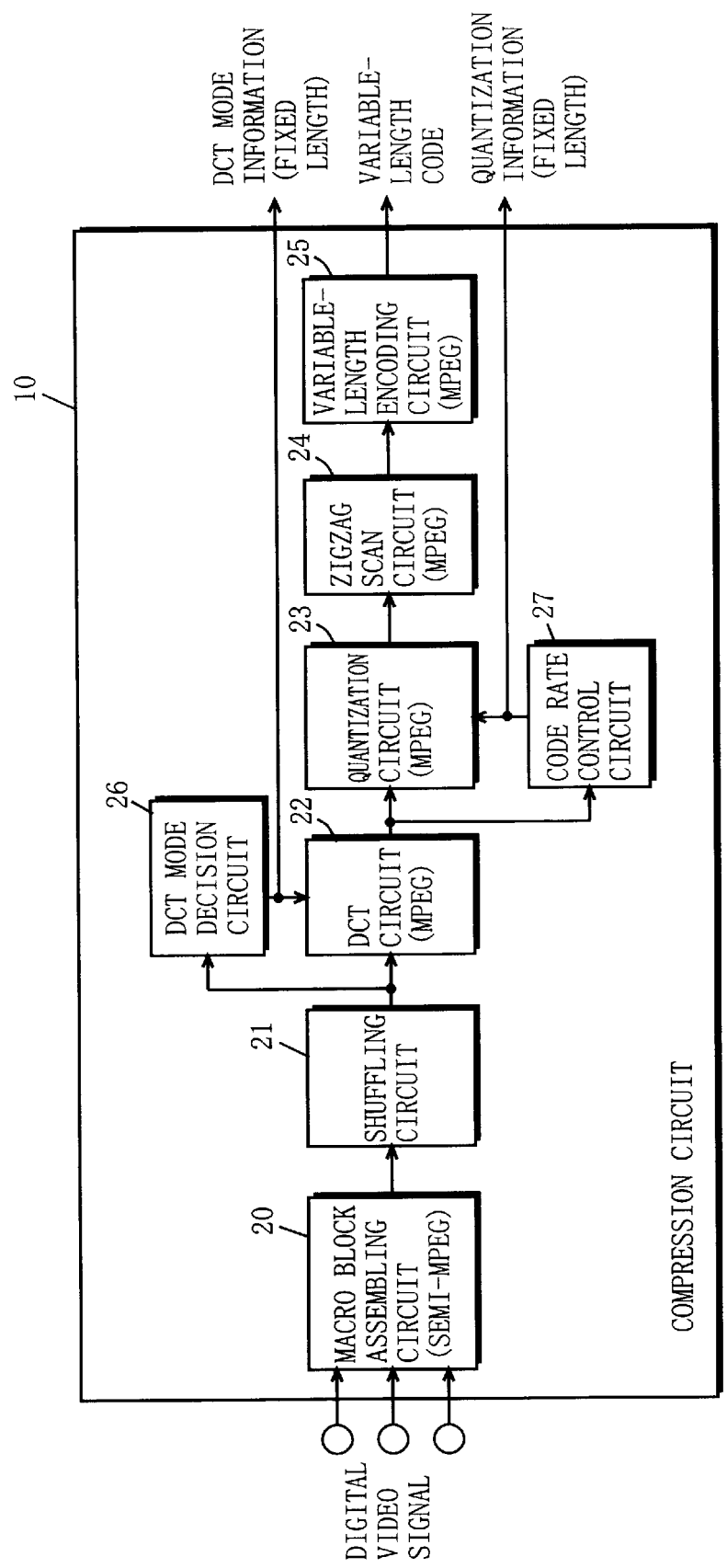
FIG. 2 is a block diagram showing the structure of the compression circuit 10 of FIG. 1 (first embodiment).

FIG. 2 is a block diagram showing the structure of the compression circuit 10 of FIG. 1.

In FIG. 2, the compression circuit 10 has a macro block assembling circuit (semi-MPEG) 20, a shuffling circuit 21, a DCT circuit (MPEG) 22, a quantization circuit (MPEG) 23, a zigzag scan circuit (MPEG) 24, a variable-length encoding circuit (MPEG) 25, a DCT mode decision circuit 26, and a code rate control circuit 27.

The character "(MPEG)" indicates a circuit which operates according to the MPEG standard, and "(semi-MPEG)" indicates a circuit which operates according to the MPEG standard except for some processes (which will be described later). (The same applies hereinafter).

Herein, the MPEG standard refers to the "MPEG 2" standard, and only the intra-pictures not using motion compensation (I pictures) are used, with (4:2:2) image format (the same applies hereinafter).

The macro block assembling circuit (semi-MPEG) 20 assembles macro blocks from the input digital video signal (for HDTV broadcast <studio standard>). The shuffling circuit 21 shuffles the output signal of the macro block assembling circuit (semi-MPEG) 20. The DCT circuit (MPEG) 22 applies DCT (Discrete Cosine Transform) to the output signal of the shuffling circuit 21. The quantization circuit (MPEG) 23 quantizes the output signal of the DCT circuit (MPEG) 22. The zigzag scan circuit (MPEG) 24 zigzag-scans the output signal of the quantization circuit (MPEG) 23. The variable-length encoding circuit (MPEG) 25 variable-length encodes the output signal of the zigzag scan circuit (MPEG) 24.

The DCT mode decision circuit 26 decides whether the DCT should be the frame DCT or field DCT. The code rate control circuit 27 controls the code rate of the output of the quantization circuit (MPEG) 23.

Referring to FIG. 1 again, the recording circuit 11 records the output signal of the compression circuit 10 on the magnetic tape. In this process, the recording circuit 11 writes one frame in a region of a predetermined size (60 tracks).

The reproducing circuit 13 reproduces the digital video signal recorded on the magnetic tape.

Figure 3:
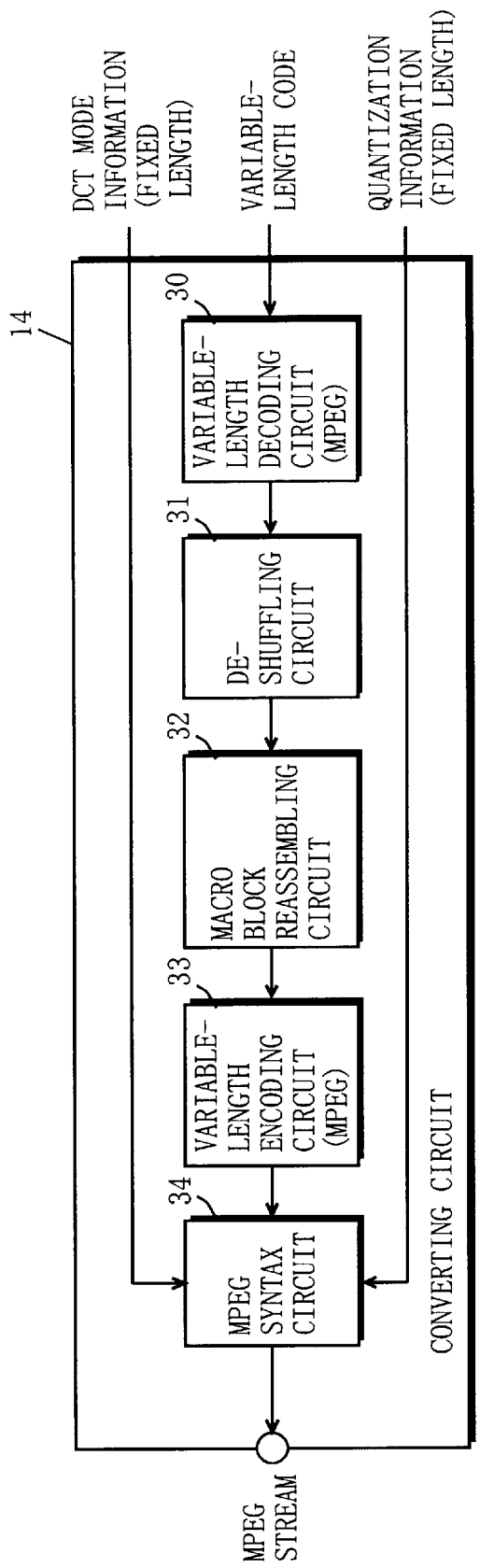
FIG. 3 is a block diagram showing the structure of the converting circuit 14 of FIG. 1 (first embodiment).

FIG. 3 is a block diagram showing the structure of the converting circuit 14 of FIG. 1.

In FIG. 3, the converting circuit 14 has a variable-length decoding circuit (MPEG) 30, a de-shuffling circuit 31, a macro block reassembling circuit 32, a variable-length encoding circuit (MPEG) 33, and an MPEG syntax circuit 34.

The variable-length decoding circuit (MPEG) 30 variable-length decodes the output signal of the reproducing circuit 13. The de-shuffling circuit 31 de-shuffles the output signal of the variable-length decoding circuit (MPEG) 30. The macro block reassembling circuit 32 reassembles macro blocks from the output signal of the de-shuffling circuit 31. The variable-length encoding circuit (MPEG) 33 variable-length encodes the output signal of the macro block reassembling circuit 32. The MPEG syntax circuit 34 converts the output signal of the macro block reassembling circuit 33 into a stream based on the MPEG syntax.

Operation of this digital video signal recording and reproducing device is now described.

In FIG. 1, the digital video signal is inputted to the compression circuit 10.

In the compression circuit 10 of FIG. 2, first, the macro block assembling circuit (semi-MPEG) 20 assembles macro blocks from the input digital video signal.

The operation of the macro block assembling circuit (semi-MPEG) 20 is now described referring to FIG. 4.

FIG. 4 is a diagram showing the process in which the macro block assembling circuit (semi-MPEG) 20 of FIG. 2 assembles macro blocks from the input digital video signal (for HDTV broadcast <studio standard>).

In FIG. 4, the digital video signal (for HDTV broadcast <studio standard>) is composed of a luminance signal (Y) with 1920 pixels*1080 lines and two color difference signals (Pb, Pr) each with 960 pixels*1080 lines.

The macro block assembling circuit (semi-MPEG) 20 first divides the luminance and color difference signals each into upper 1072 lines and lower 8 lines.

Figure 27:
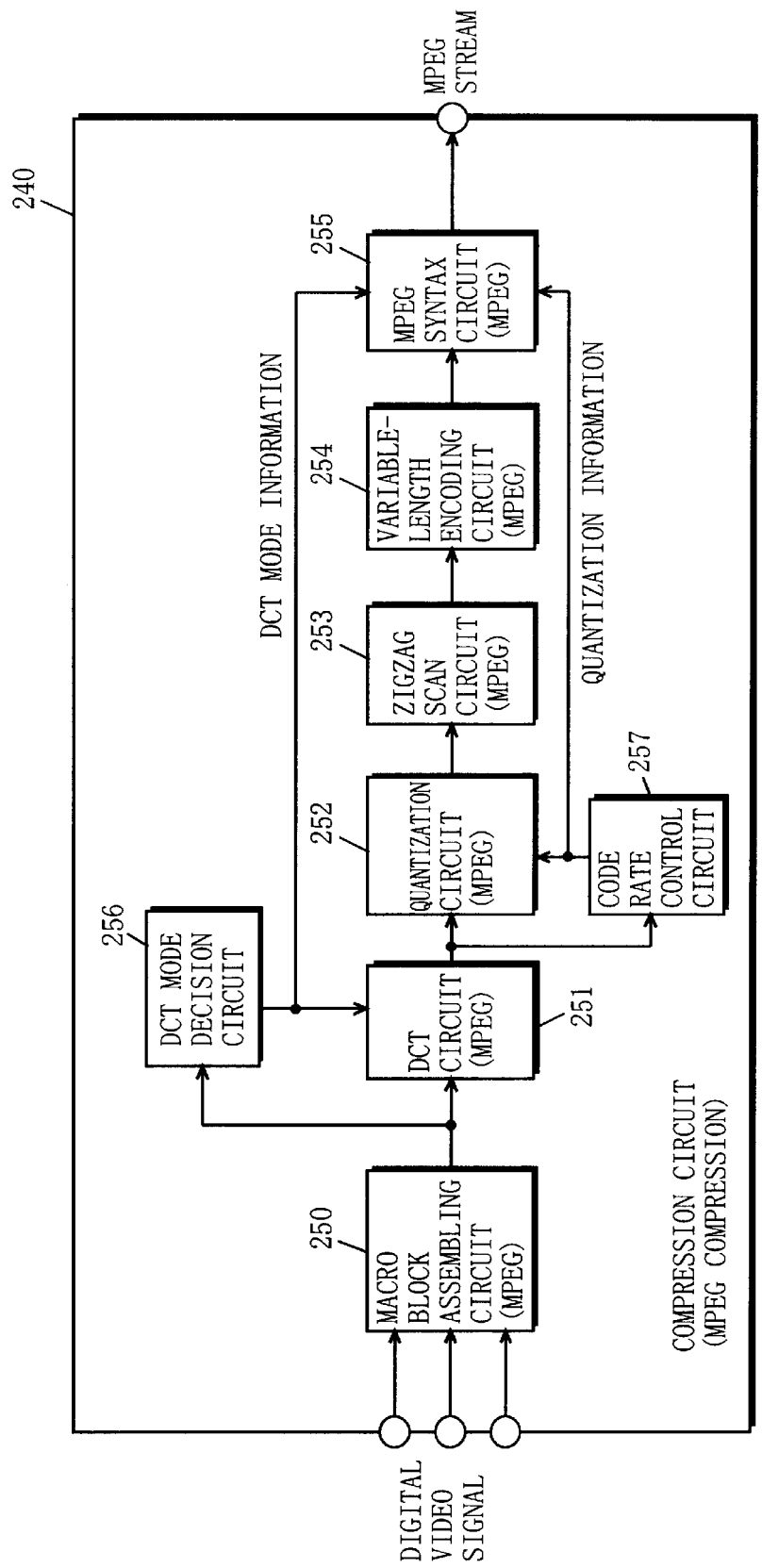
FIG. 27 is a block diagram showing the structure of the compression circuit 240 of FIG. 26 (that provided in the MPEG encoder).

Next, the macro block assembling circuit (semi-MPEG) 20 applies the following processing to the upper 1072 lines of the luminance signal and the color difference signals. That is to say, it extracts 2*2=4 blocks as a unit from the luminance signal, where each block consisting of 8 pixels*8 lines. It also extracts two blocks from each of the two color difference signals, where each block consisting of 8 pixels*8 lines. The extracted 8 blocks are handled as one macro block (in the drawing the macro block "0"). This processing is the same as the macro block assembling process which the macro block assembling circuit (MPEG) 250 of FIG. 27 performs after the process of increasing the number of effective lines (see FIG. 29).

Next, the macro block assembly circuit (semi-MPEG) 20 applies the following processing to the lower 8 lines of the luminance and color difference signals. That is to say, it extracts 4*1=4 blocks as a unit from the luminance signal, where each block consisting of 8 pixels*8 lines. It also extracts two blocks from each of the two color difference signals, where each block consisting of 8 pixels*8 lines. The extracted 8 blocks are handled as one macro block (in the drawing the macro block "N").

Accordingly, the macro block assembling circuit (semi-MPEG) 20 assembles 8100 macro blocks from one frame of the digital video signal for HDTV broadcast <studio standard>.

Figure 23:
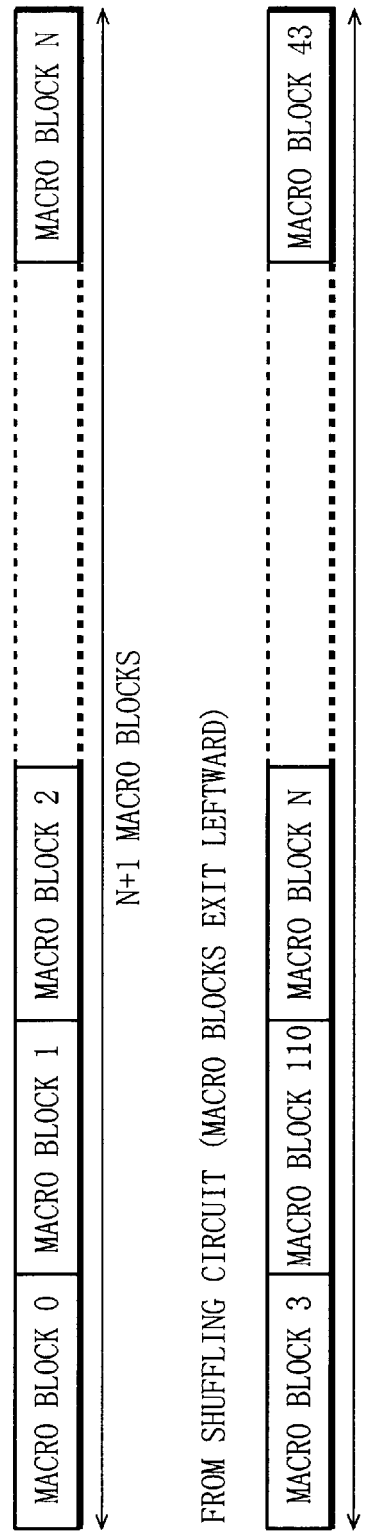
FIG. 23 is a diagram showing an example of input/output of the shuffling circuit 182 of FIG. 20.

Next, Referring to FIG. 2 again, the shuffling circuit 21 shuffles the output signal of the macro block assembling circuit (semi-MPEG) 20 (see FIG. 23).

Next, the DCT mode decision circuit 26 refers to the output signal of the shuffling circuit 21 and decides, for each block, whether to apply the frame DCT or field DCT, then informs the DCT circuit (MPEG) 22 of the result (DCT mode information). In making the decision, the DCT mode decision circuit 26 decides to apply the field DCT or frame DCT to the macro blocks included in the upper 1072 lines. For the macro blocks included in the lower 8 lines, it decides to perform the frame DCT. In response to the information, the DCT circuit (MPEG) 22 applies the frame DCT or field DCT to the output signal of the shuffling circuit 21 (specifically, it applies the frame DCT or field DCT to the macro blocks included in the upper 1072 lines of the output signal and applies only the frame DCT to the macro blocks included in the lower 8 lines).

Next, the code rate control circuit 27 estimates the code rate for 5 macro blocks which will be outputted from the quantization circuit (MPEG) 23 on the basis of the output signal of the DCT circuit (MPEG) 22 and controls the code rate so that 5 macro blocks can be accommodated in 5 sync blocks (i.e. it gives quantization information for code rate control to the quantization circuit (MPEG) 23). While the code rate is controlled so that 5 macro blocks can be stored in 5 sync blocks in this example, it is not restrictive and the code rate may be controlled so that N macro blocks can be stored in N sync blocks (N is an arbitrary natural number). In response, the quantization circuit (MPEG) 23 quantizes the output signal of the DCT circuit (MPEG) 22.

This code rate control process is now described. For example, the code rate control circuit 27 has 16 kinds of quantization information and first calculates the total code rate which would be obtained when 5 macro blocks are quantized on the basis of every kind of the quantization information. Next, it compares the 16 pieces of total code rates obtained by the calculation with the code rate corresponding to 5 sync blocks, selects the most appropriate quantization information from the 16 kinds of quantization information, and gives it to the quantization circuit (MPEG) 23. (That is to say, it selects the quantization information of a kind which, when used to quantize 5 macro blocks, would provide the largest total code rate in the range not exceeding the code rate corresponding to 5 sync blocks.)

Next, the zigzag scan circuit (MPEG) 24 zigzag-scans the output signal of the quantization circuit (MPEG) 23. Next, the variable-length encoding circuit (MPEG) 25 variable-length encodes the output signal of the zigzag scan circuit (MPEG) 24.

The DCT mode information outputted from the DCT mode decision circuit 26 and the quantization information outputted from the code rate control circuit 27 are given to the recording circuit 11 together with the variable-length code outputted from the variable-length encoding circuit (MPEG) 25. The DCT mode information and the quantization information are of fixed length.

Figure 19:
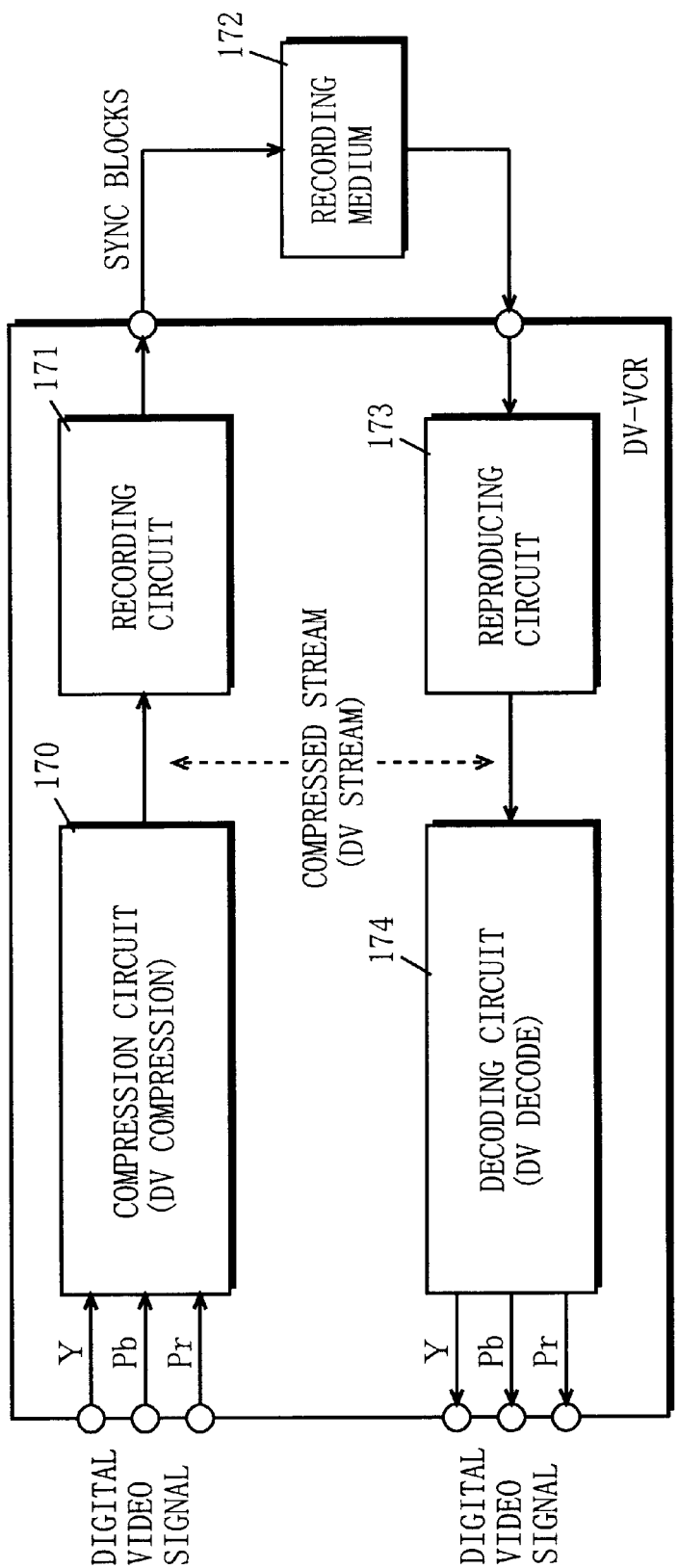
FIG. 19 is a block diagram showing the entire structure of a conventional digital video signal recording and reproducing device based on the DV standard <HD> (conventional DV-VCR <HD>).
Figure 20:
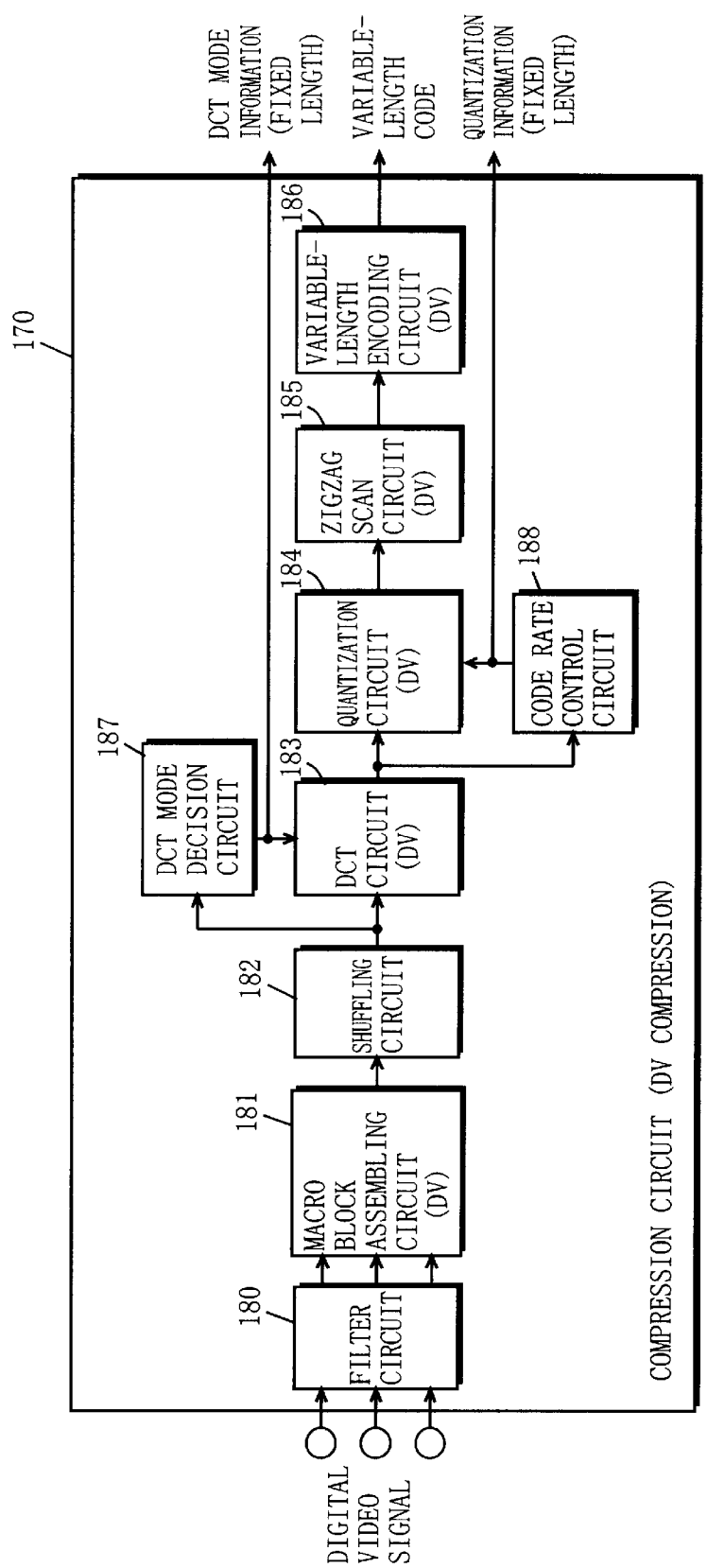
FIG. 20 is a block diagram showing the structure of the compression circuit 170 of FIG. 19.
Figure 21:
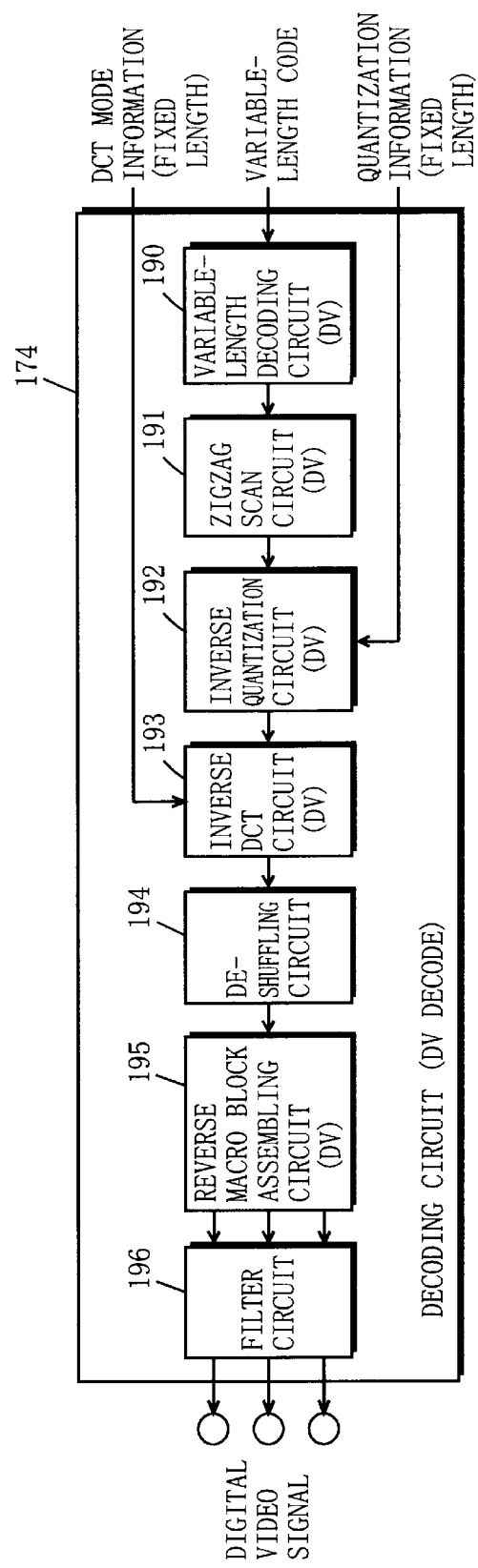
FIG. 21 is a block diagram showing the structure of the decoding circuit 174 of FIG. 19.
Figure 22:
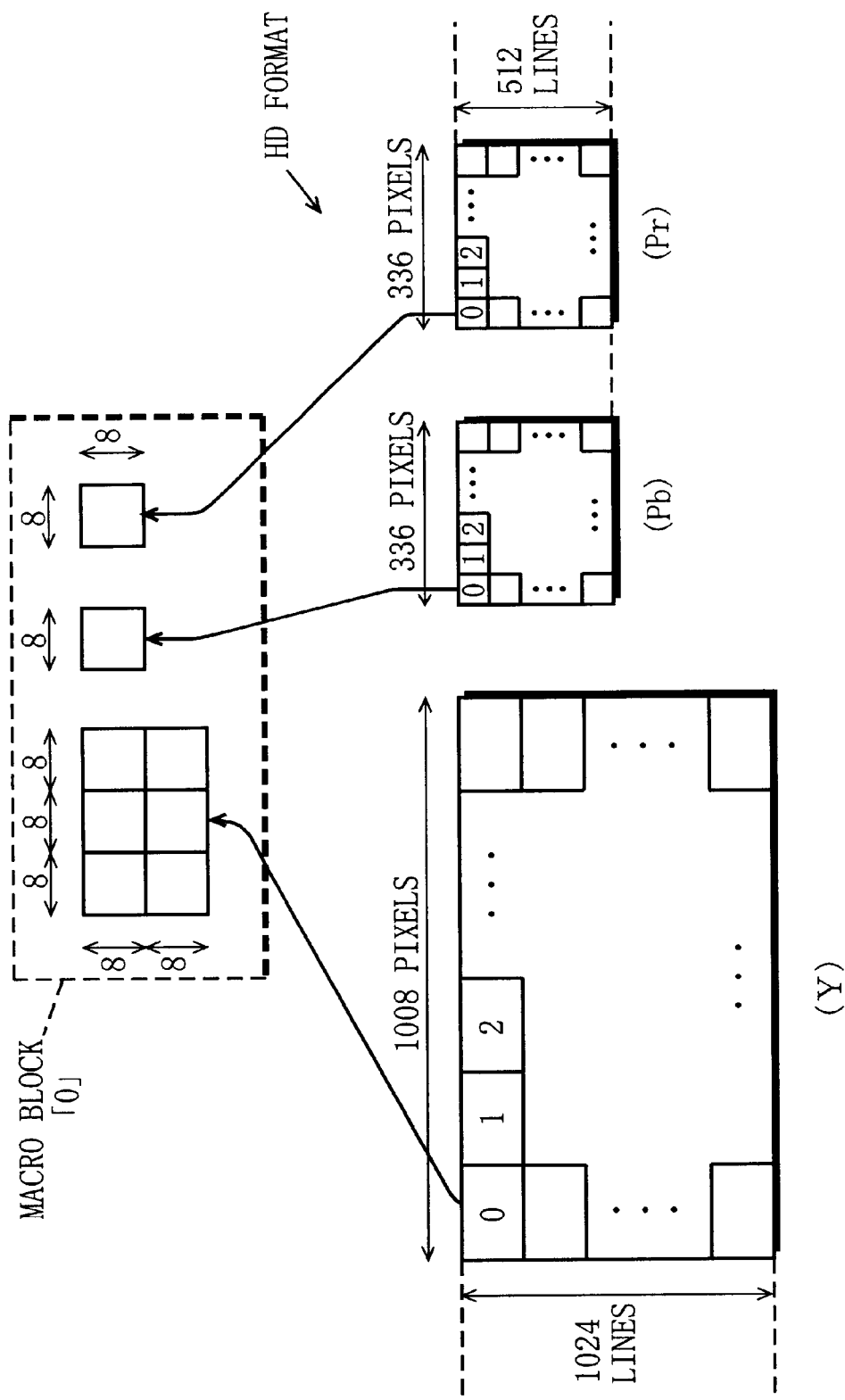
FIG. 22 is a diagram used to explain the process in which the macro block assembling circuit (DV) 181 of FIG. 20 assembles macro blocks from the output signal of the filter circuit 180 or a digital video signal (HD format).

In FIG. 1, the recording circuit 11 records the output signal of the compression circuit 10 on the magnetic tape (the variable-length code, DCT mode information and quantization information). In this process, the recording circuit 11 writes one frame of signal (8100 macro blocks) in a region of a predetermined size (60 tracks=8100 sync blocks in this example) This processing is the same as that of the recording circuit 171 of FIG. 19 except for the recording rate (see FIG. 24).

Figure 24:
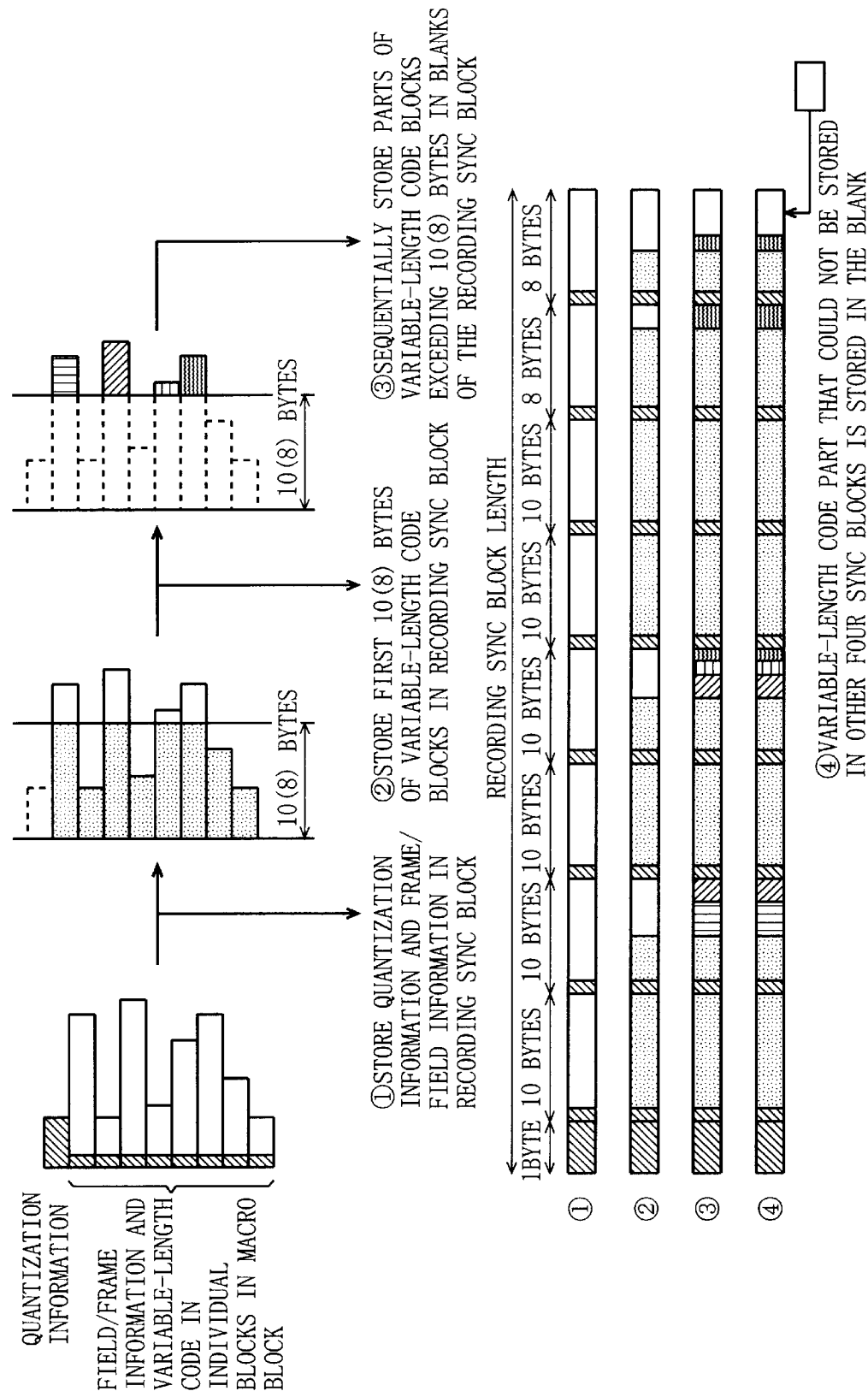
FIG. 24 is a diagram used to explain operation of the recording circuit 170 of FIG. 19.
Figure 25:
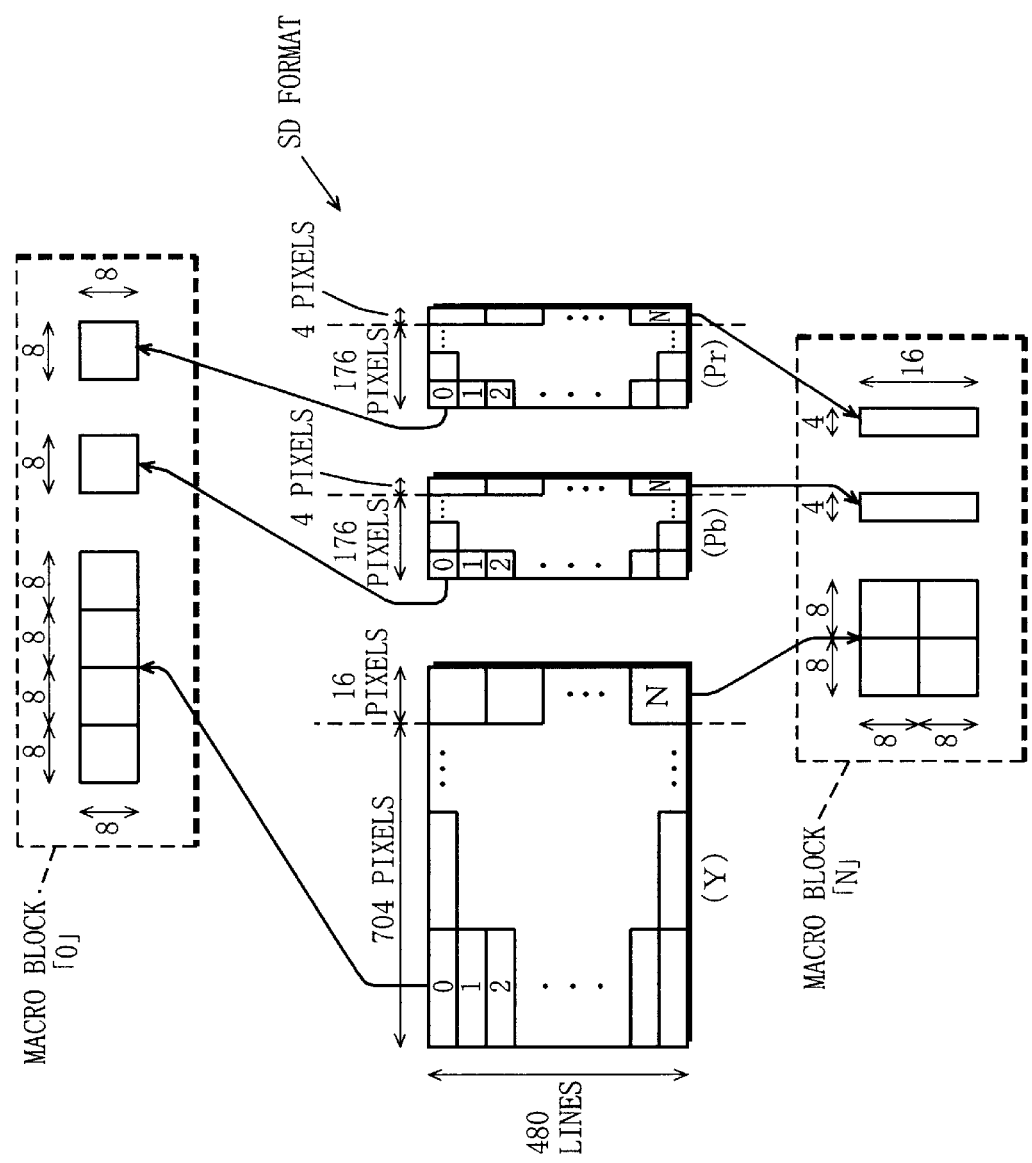
FIG. 25 is a diagram used to explain the process in which a macro block assembling circuit (not shown) provided in another conventional digital video signal recording and reproducing device based on the DV standard <SD> (conventional DV-VCR <SD>) assembles macro blocks from a digital video signal (SD format).
Figure 26:
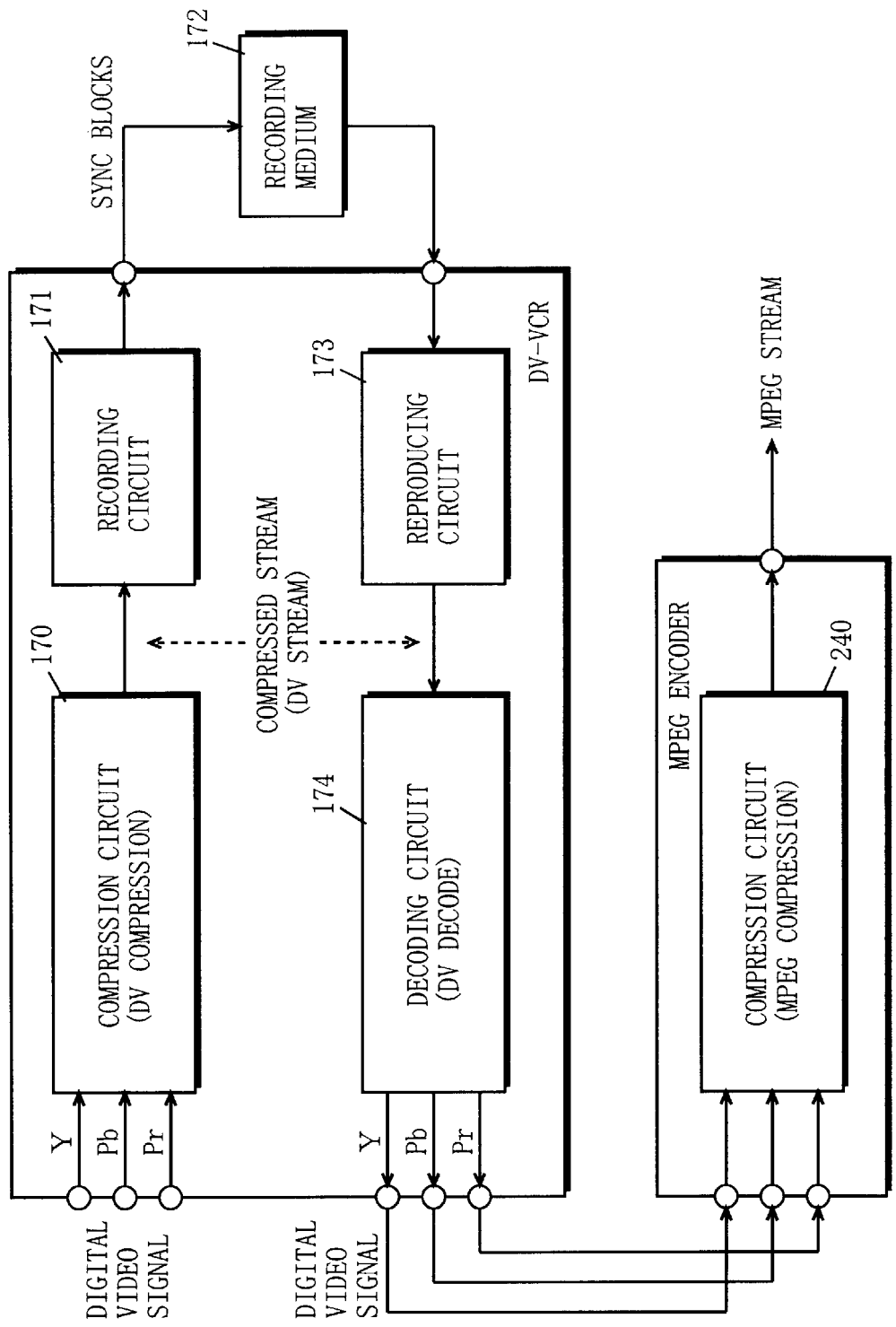
FIG. 26 is a block diagram showing the entire structure of a digital video signal recording and reproducing device which uses the DV-VCR of FIG. 19 and an existing MPEG encoder to extract an MPEG stream on the reproducing side (conventional digital video signal recording and reproducing device).

That is, in FIG. 24, the recording circuit 11 receives, in units of 5 macro blocks (1 macro block=8 blocks), the variable-length code (8 blocks) outputted from the variable-length encoding circuit (MPEG) 25, the DCT mode information outputted from the DCT mode decision circuit 26, and the quantization information outputted from the code rate control circuit 27.

When recording the variable-length code, DCT mode information and quantization information on the magnetic tape, the recording circuit 11 stores 5 macro blocks in every 5 sync blocks (see BACKGROUND ART for details). In the process of recording, while 5 macro blocks are stored in 5 sync blocks in this example, N macro blocks can be stored in N sync blocks (N is an arbitrary natural number).

Next, referring to FIG. 1 again, the reproducing circuit 13 reproduces the digital video signal recorded on the magnetic tape. The output signal of the reproducing circuit 13 (the variable-length code, DCT mode information and quantization information) is inputted to the converting circuit 14.

In the converting circuit 14 of FIG. 3, first, the variable-length decoding circuit (MPEG) 30 variable-length decodes the output signal (variable-length code) of the reproducing circuit 13 and outputs a signal in which individual blocks have a constant signal length (fixed-length code). The de-shuffling circuit 31 de-shuffles the output signal (fixed-length code) of the variable-length decoding circuit (MPEG) 30.

Next, the macro block reassembling circuit 32 reassembles macro blocks from the output signal of the de-shuffling circuit 31. That is to say, it converts macro blocks as shown in FIG. 4 (semi-MPEG macro blocks) into macro blocks as shown in FIG. 29 (MPEG macro blocks including dummy blocks).

Since only the frame DCT is selected for the lower 8-line macro blocks in the compression circuit 10, the conversion from the semi-MPEG macro blocks into MPEG macro blocks can be achieved by increasing the number of effective lines by 8 lines as shown in FIG. 28 (i.e. by adding 8 lines of dummy blocks).

If the field DCT is selected for the lower 8-line macro blocks in the compression circuit 10, the converting circuit 14 cannot convert the macro blocks into MPEG macro blocks without once converting them back into a digital video signal. The reason for this is described below referring to FIGS. 5(A) and (B).

Figure 5A:
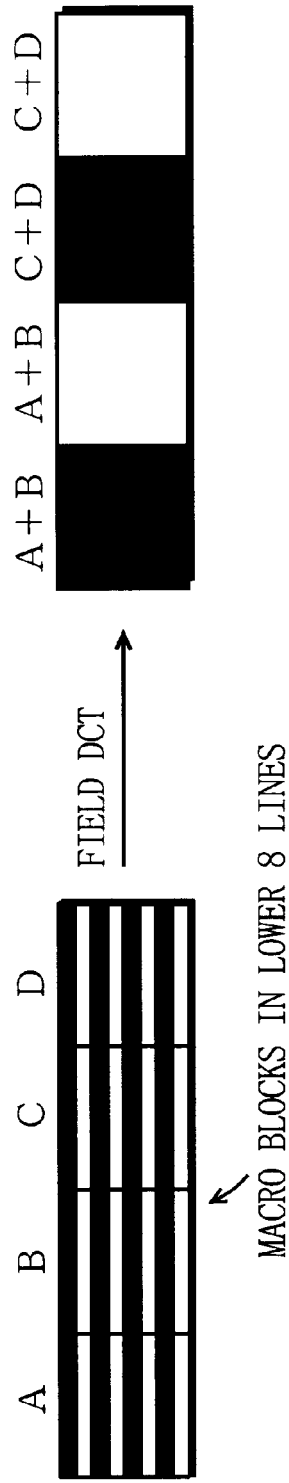
FIGS. 5(A) and (B) are diagrams used to explain why, if the compression circuit 10 FIG. 1 selects field DCT for the lower 8 lines of macro blocks, the converting circuit 14 cannot convert the macro blocks into MPEG macro blocks without converting the macro blocks back into the digital video signal.
Figure 5B:
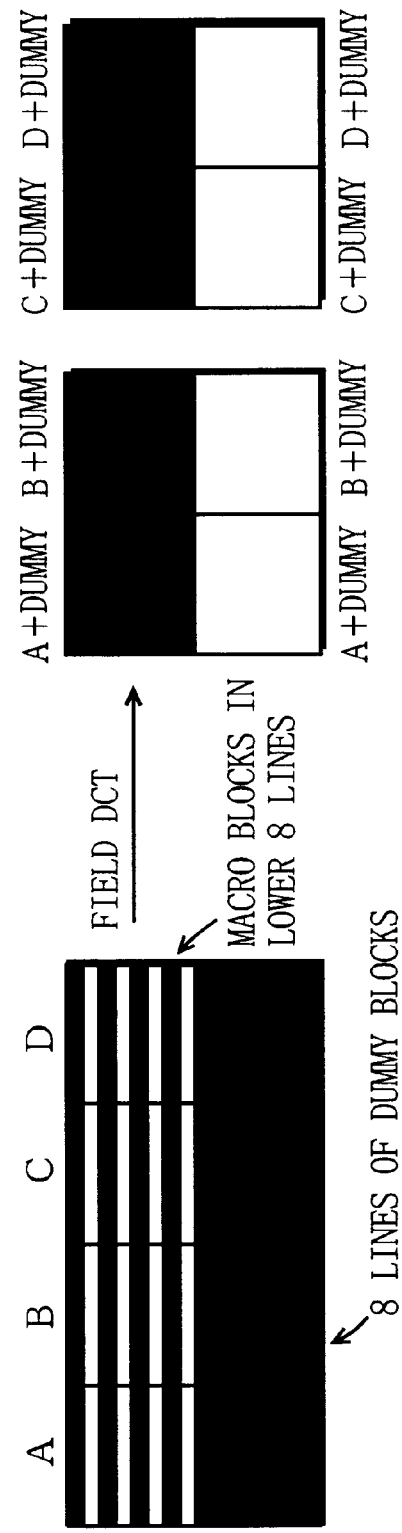

If the field DCT is selected for the lower 8-line macro blocks, as shown in FIG. 5(A), one block obtained after DCT contains a mixture of data which were contained in two blocks before DCT (e.g., "A"+"B"). According to the MPEG standard, however, DCT is applied with 8 lines of dummy blocks added to the lower 8 lines of macro blocks as shown in FIG. 5(B) Therefore, one block obtained after the DCT contains a mixture of data which were contained in one block before DCT and a dummy block (e.g. "A"+"dummy").

When converting the block containing a mixture of data which were contained in two blocks before DCT (e.g. "A"+"B") into the block containing a mixture of data which were contained in one block before DCT and a dummy block (e.g. "A"+"dummy"), it is necessary to separate the mixed two blocks of data from each other (e.g. to separate "A"+"B" into "A" and "B"). However, this cannot be achieved without once converting the mixed two block data (e.g. "A"+"B") into a digital video signal.

Next, the variable-length encoding circuit (MPEG) 33 variable-length encodes the output signal of the macro block reassembling circuit 32. The MPEG syntax circuit 34 converts the output signal of the variable-length encoding circuit (MPEG) 33 into a stream based on the syntax defined by the MPEG standard (an MPEG stream) on the basis of the output signal from the reproducing circuit 13 (the DCT mode information and quantization information).

The digital video signal recording and reproducing device thus outputs an MPEG stream.

As explained above, when the digital video signal recording and reproducing device records the HDTV broadcast digital video signal <studio standard>, the recording circuit 11 writes one frame of signal into 8100 sync blocks.

The compression circuit 10 performs compression according to the MPEG (4:2:2) except for some processes. In this operation, in correspondence with the recording process of the recording circuit 11, the macro block assembling circuit (semi-MPEG) 20 in the compression circuit 10 assembles 8100 macro blocks per frame without increasing the number of effective lines, unlike in MPEG (i.e. without adding dummy blocks). The code rate control circuit 27 then controls the code rate so that 5 macro blocks can be exactly, without any remainder nor shortage, stored in 5 sync blocks (fixed length). Further, in the converting circuit 14, the macro block reassembling circuit 32 reassembles the macro blocks into macro blocks equivalent to those obtained through the process of increasing the number of lines. Accordingly, they can be converted into an MPEG stream without the need to decode the reproduced signal, and the reproducing side can thus extract an MPEG stream without causing noticeable deterioration of the image quality. Furthermore, the capacity of the recording medium 12 is not wasted by recording dummy blocks.

While the macro block assembling circuit (semi-MPEG) 20 assembles macro blocks as shown in FIG. 4 in the above, it may assemble them in any way as long as it can assemble 8100 macro blocks per frame from an HDTV broadcast digital video signal <studio standard> without increasing the number of effective lines (i.e. without adding dummy blocks).

Further, while the digital video signal recording and reproducing device above records a digital video signal for HDTV broadcast <studio standard>, other digital video signals in which the number of effective lines is not a multiple of 16 can be recorded as well. (This applies also to the second to fourth embodiments described later).

That is to say, when the digital video signal recording and reproducing device records other digital video signal than that described above, the recording circuit 11 writes one frame of the digital video signal into fixed-length sync blocks of a number previously determined for that signal (which is referred to as a given number hereinafter). In correspondence with this recording processing, the macro block assembling circuit (semi-MPEG) 20 in the compression circuit 10 assembles macro blocks of the same number as the given number from each frame of the digital video signal without, unlike MPEG, adding dummy blocks. The code rate control circuit 27 then controls the code rate so that 5 macro blocks can be exactly, without any remainder nor shortage, stored in 5 fixed-length sync blocks.

In the converting circuit 14, the macro block reassembling circuit 32 reassembles the macro blocks into macro blocks equivalent to those obtained through the process of increasing the lines. Thus, the reproduced signal can be converted into an MPEG stream without being decoded, and the reproducing side can extract an MPEG stream without causing serious deterioration of the image quality. Furthermore, the capacity of the recording medium 12 is not wasted since no dummy block is recorded.

The format of other digital video signals mentioned above must be (4:4:4), (4:2:2) or (4:2:0) permitted by the MPEG. However, when a filter circuit (not shown) for converting the format of the digital video signal into an image format permitted by MPEG is provided preceding the macro block assembling circuit 20 in the compression circuit 10, then the digital video signals do not have to be those of the formats permitted by MPEG.

The digital video signal recording and reproducing device above uses a magnetic tape as the recording medium 12. However, the recording medium 12 may be an optical disk, a magnetic disk, etc. (This applies also to the second to fourth embodiments described later).

As described above, according to this embodiment, in the process of compression, macro blocks with 16 lines and macro blocks with 8 lines are assembled from a digital video signal having 1080 effective lines without increasing the number of effective lines to adapt the signal to the MPEG standard. The number of the 16-line macro blocks and 8-line macro blocks assembled for one frame is equal to the number (fixed number) of sync blocks for recording one frame of signal (the total number of the two kinds of macro blocks is equal to the number of the synch blocks). Then field/frame DCT defined by the MPEG standard is applied to the macro blocks contained in the upper 1072 lines (i.e. macro blocks with 16 lines; e.g. the macro block "0" in FIG. 4), and only the frame DCT defined by MPEG is applied to the macro blocks contained in the lower 8 lines (i.e. macro blocks with 8 lines; e.g. the macro block "N" in FIG. 4). Further, the code rate is controlled so that N macro blocks (N is an arbitrary natural number) can be exactly, without any remainder nor shortage, stored in N fixed-length sync blocks. In the process of conversion, the macro blocks are reassembled into macro blocks equivalent to those obtained through the process of increasing the number of lines as defined by the MPEG standard.

The point is that, in the process of compression, the macro blocks with 8 lines are subjected only to the frame DCT defined by the MPEG standard, so that, in the process of conversion, the macro blocks can be reassembled, just by adding 8-line dummy blocks to the 8-line macro blocks, into macro blocks equivalent to those obtained through the process of increasing the number of lines as defined by the MPEG standard. (If field/frame DCT defined by the MPEG standard is applied to the 8-line macro blocks in the process of compression, then, in the process of conversion, it is impossible to reassemble them into macro blocks equivalent to those obtained by increasing the number of lines as defined by the MPEG standard without once converting them back into a digital video signal).

The reproduced signal can thus be converted into an MPEG stream without being decoded and the reproducing side can extract an MPEG stream without suffering serious deterioration of the image quality. Furthermore, the capacity of the recording medium is not wastefully consumed since no dummy block is recorded.

In addition, the device achieves compression according to the MPEG standard except that it assembles macro blocks without increasing the number of effective lines and controls the code rate of those macro blocks, so that the reproduced signal can be converted into an MPEG stream through light operations. Accordingly the device can be simple in structure.

While this embodiment has shown an example where a digital video signal with 1080 effective lines is recorded and reproduced, the effects above can be obtained with digital video signals in which the number of effective lines is a multiple of 8 but not a multiple of 16 (e.g. 1064, 1096, etc.).

Further, the effects above can be obtained also with digital video signals in which the remainder left when the number of effective lines is divided by 16 is not less than 1 nor more than 7, in which case, however, the macro block assembling circuit (semi-MPEG) 20 increases the number of effective lines by 7 lines maximum when assembling macro blocks and therefore dummy blocks of 7 lines maximum are wastefully recorded (more specifically, it increases the number of effective lines by 7 lines when the remainder is 1, by 6 lines when the remainder is 2, . . . by 1 line when the remainder is 7).

Now the point that dummy blocks of 7 lines maximum are wastefully recorded is additionally explained. In the MPEG standard, if the remainder left when the number of effective lines of a digital video signal is divided by 16 is between 1 and 7, the number of effective lines is increased by 15 lines maximum (more specifically, the number of effective lines is increased by 15 lines when the remainder is 1, by 14 lines when the remainder is 2, . . . and by 9 lines when the remainder is 7). Accordingly, although dummy blocks of 7 lines maximum are wastefully recorded when the remainder left after the division of the number of effective lines by 16 is not less than 1 no more than 7, the number of dummy blocks wastefully recorded is smaller by 8 lines than when the number of effective lines is increased according to the MPEG standard.

A second embodiment described next is a modification of the first embodiment, where the variable-length encoding is done not by MPEG but by DV in the process of compression.

(Second Embodiment)

A digital video signal recording and reproducing device of the second embodiment of the present invention (hereinafter referred to as digital video signal recording and reproducing device) has the same basic structure as the digital video signal recording and reproducing device of the first embodiment. Therefore it is described referring to FIG. 1.

As in the first embodiment, it is assumed that a digital video signal for HDTV broadcast <studio standard> is inputted to the digital video signal recording and reproducing device. The recording medium 12 is a magnetic tape.

The structure of the digital video signal recording and reproducing device is the same as that of the first embodiment except for the following points.

Figure 6:
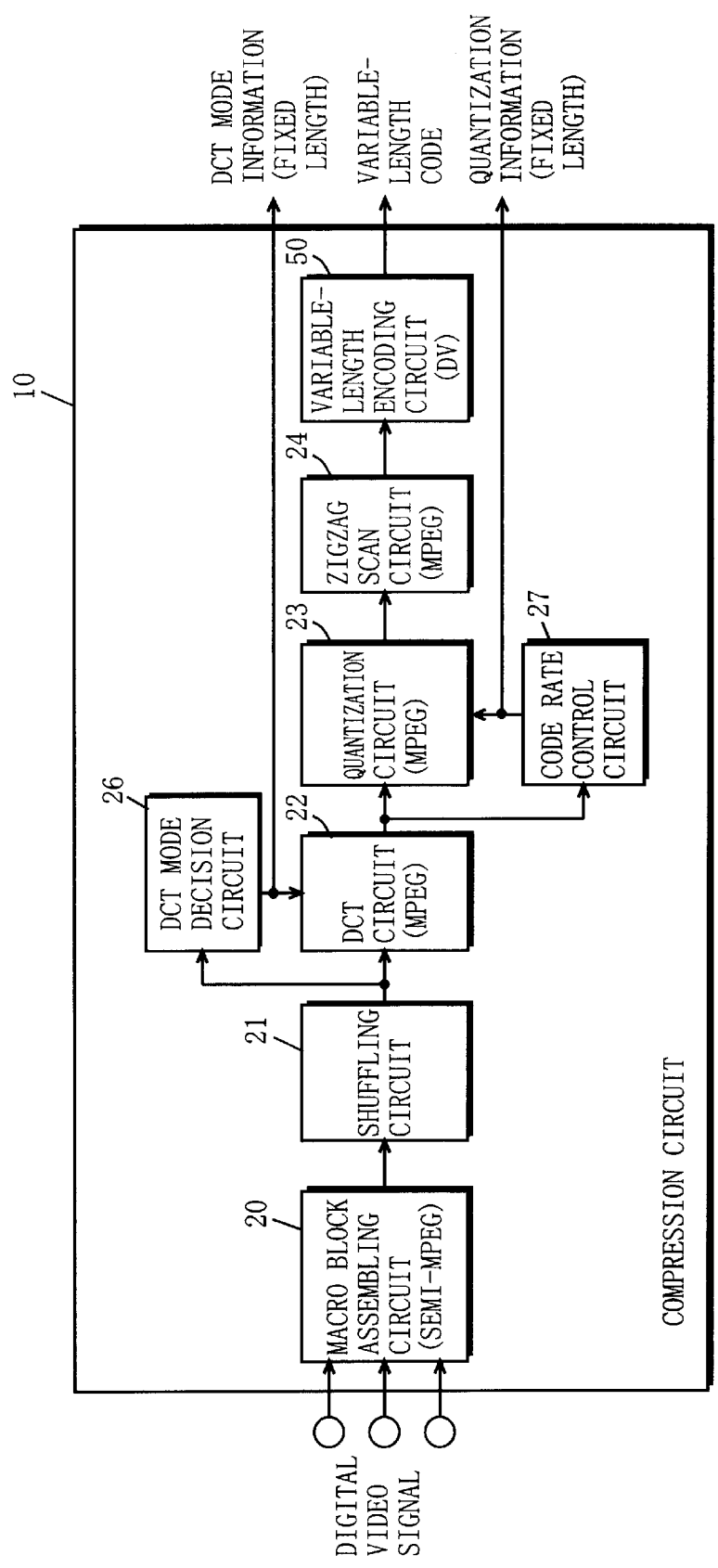
FIG. 6 is a block diagram showing the structure of the compression circuit 10 of FIG. 1 (second embodiment).

FIG. 6 is a block diagram showing the structure of the compression circuit 10 of FIG. 1. The compression circuit 10 shown in FIG. 6 includes a variable-length encoding circuit (DV) 50 in place of the variable-length encoding circuit (MPEG) 25 provided in the compression circuit 10 shown in FIG. 2.

In FIG. 6, the variable-length encoding circuit (DV) 50 variable-length encodes the output signal of the zigzag scan circuit (MPEG) 24 according to the DV standard. Other components operate in the same way as those shown in FIG. 2 (refer to the first embodiment).

FIG. 7 is a block diagram showing the structure of the converting circuit 14 of FIG. 1. The converting circuit 14 shown in FIG. 7 includes a variable-length decoding circuit (DV) 60 in place of the variable-length decoding circuit (MPEG) 30 of the converting circuit 14 of FIG. 3.

In FIG. 7, the variable-length decoding circuit (DV) 60 variable-length decodes the output signal (variable-length code) of the reproducing circuit 13 according to the DV standard. Other components operate in the same way as those shown in FIG. 3 (refer to the first embodiment).

Operation of the digital video signal recording and reproducing device is the same as that of the first embodiment except for the points below.

In FIG. 6, in the compression circuit 10, the variable-length encoding circuit (DV) 50 variable-length encodes the output signal of the zigzag scan circuit (MPEG) 24 according to the DV standard.

In FIG. 7, in the converting circuit 14, the variable-length decoding circuit (DV) 60 variable-length decodes the output signal (variable-length code) of the reproducing circuit 13 according to the DV standard.

In this way, in this embodiment, the variable-length encoding in the process of compression is achieved not by MPEG but by DV. Accordingly, in the process of decoding, the signal is once variable-length decoded by DV and then variable-length encoded by MPEG.

In this case, though the structure is somewhat complex, the reproducing side can extract an MPEG stream without wastefully consuming the capacity of the recording medium and without considerably deteriorating the image quality, as in the first embodiment.

The third embodiment described next is a modification of the first embodiment, where the reproducing side can extract a digital video signal as well as an MPEG stream.

(Third Embodiment)

Figure 8:
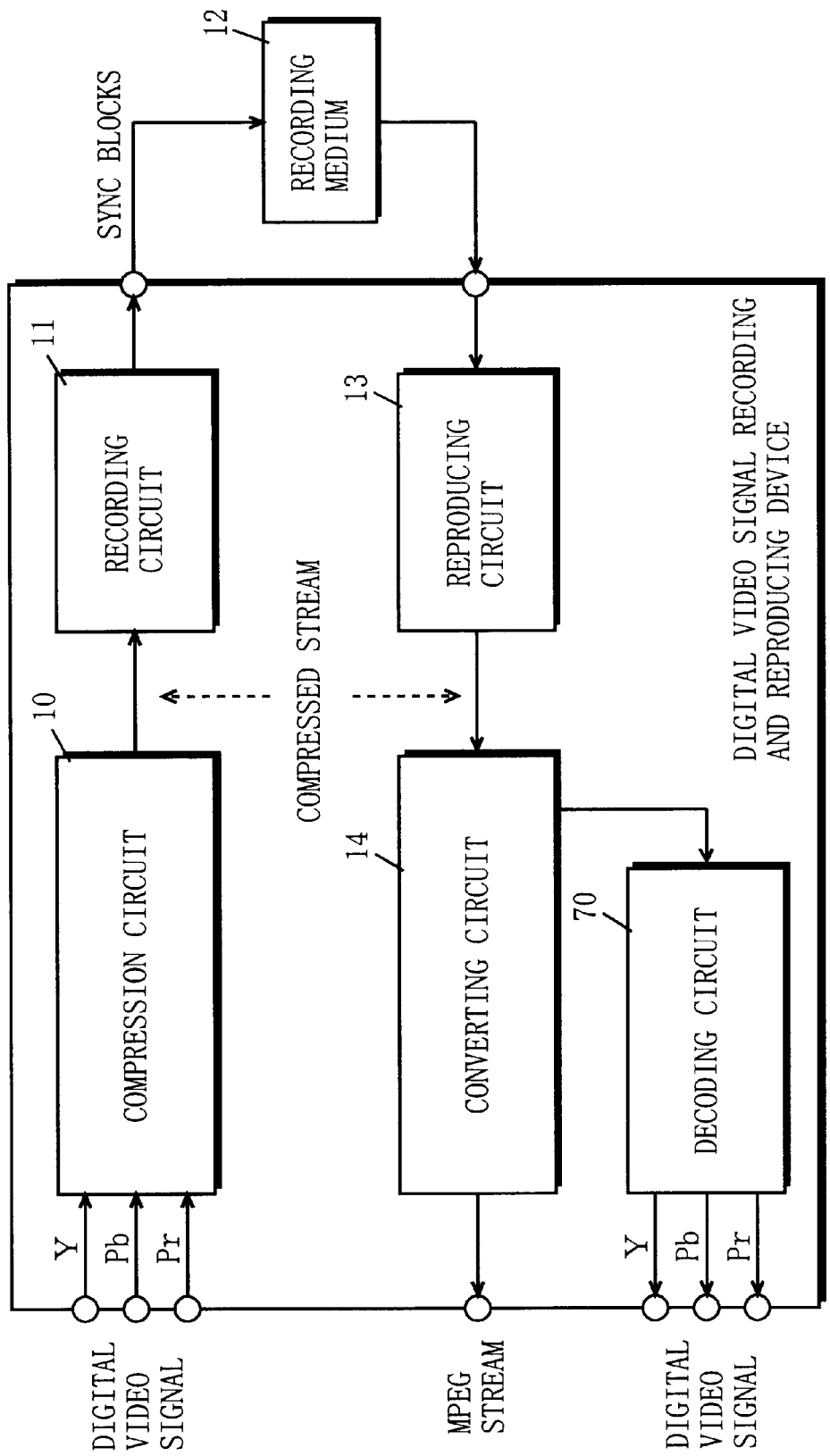
FIG. 8 is a block diagram showing the entire structure of a digital video signal recording and reproducing device according to a third embodiment of the present invention (this diagram is referred to also in the fourth and fifth embodiments).

FIG. 8 is a block diagram showing the basic structure of a digital video signal recording and reproducing device of the third embodiment of the present invention (hereinafter referred to as digital video signal recording and reproducing device).

As shown in FIG. 8, the digital video signal recording and reproducing device has a decoding circuit 70 in addition to the structure of the digital video signal recording and reproducing device of the first embodiment (see FIG. 1).

As in the first embodiment, it is assumed that a digital video signal for HDTV broadcast <studio standard> is inputted to the digital video signal recording and reproducing device. The recording medium 12 is a magnetic tape.

In FIG. 8, the compression circuit 10, recording circuit 11 and reproducing circuit 13 are the same as those shown in FIG. 1. The structure of the compression circuit 10 is shown in FIG. 2.

Figure 9:
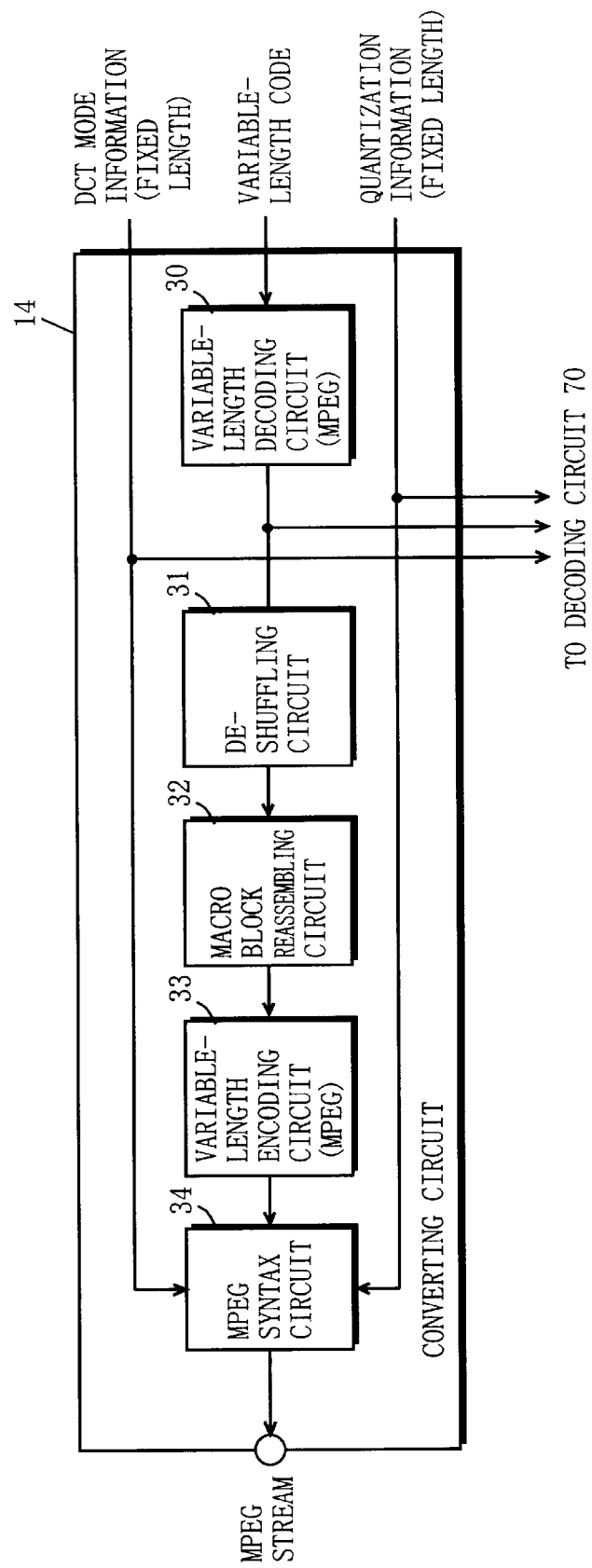
FIG. 9 is a block diagram showing the structure of the converting circuit 71 of FIG. 8 (third embodiment).

FIG. 9 is a block diagram showing the structure of the converting circuit 14 of FIG. 8. The converting circuit 14 shown in FIG. 9 has basically the same structure as the converting circuit 14 of FIG. 3. The converting circuit 14 of FIG. 9 differs from the converting circuit 14 of FIG. 3 in that the output signal of the variable-length decoding circuit (MPEG) 30 is given also to the decoding circuit 70.

The decoding circuit 70 performs operation reverse to that of the compression circuit 10.

Figure 10:
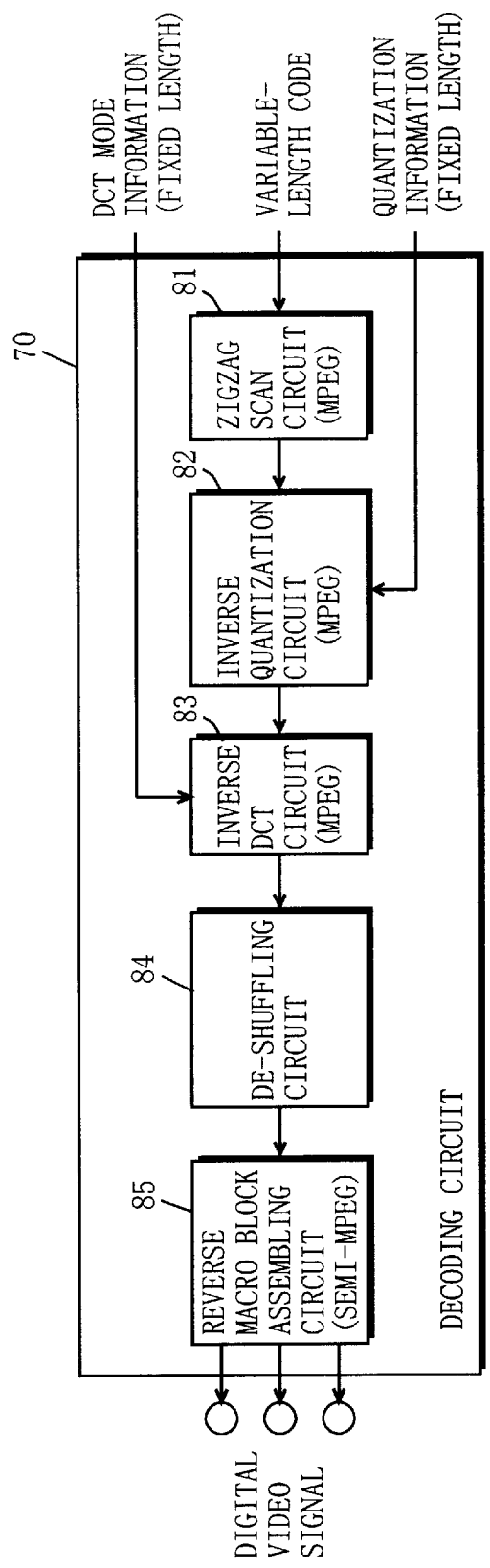
FIG. 10 is a block diagram showing the structure of the decoding circuit 70 of FIG. 8 (third embodiment).

FIG. 10 is a block diagram showing the structure of the decoding circuit 70 of FIG. 8.

In FIG. 10, the decoding circuit 70 has a zigzag scan circuit (MPEG) 81, an inverse quantization circuit (MPEG) 82, an inverse DCT circuit (MPEG) 83, a de-shuffling circuit 84, and a reverse macro block assembling circuit (semi-MPEG) 85.

The zigzag scan circuit (MPEG) 81 zigzag-scans the output signal of the variable-length decoding circuit (MPEG) 30 of the converting circuit 14 (FIG. 9). The inverse quantization circuit (MPEG) 82 applies inverse quantization to the output signal of the zigzag scan circuit (MPEG) 81 on the basis of the output signal (quantization information) from the reproducing circuit 13. The inverse DCT circuit (MPEG) 83 applies inverse DCT to the output signal of the inverse quantization circuit (MPEG) 82 on the basis of the output signal (DCT mode information) from the reproducing circuit 13. The de-shuffling circuit 84 de-shuffles the output signal of the inverse DCT circuit (MPEG) 83. The reverse macro block assembling circuit (semi-MPEG) 85 assembles a digital video signal from the output signal (macro blocks) of the de-shuffling circuit 84.

Operation of this digital video signal recording and reproducing device is now described.

In FIG. 8, when a digital video signal is inputted to the digital video signal recording and reproducing device, the compression circuit 10, recording circuit 11, reproducing circuit 13 and converting circuit 14 operate as explained in the first embodiment.

The decoding circuit 70 is supplied with the output signal of the variable-length decoding circuit (MPEG) 30 in the converting circuit 14 shown in FIG. 9 and the output signal (DCT mode information and quantization information) from the reproducing circuit 13.

In the decoding circuit 70 of FIG. 10, first, the zigzag scan circuit (MPEG) 81 zigzag-scans the output signal of the variable-length decoding circuit (MPEG) 30 of the converting circuit 14 (FIG. 9). Next, the inverse quantization circuit (MPEG) 82 applies inverse quantization to the output signal of the zigzag scan circuit (MPEG) 81 on the basis of the output signal (quantization information) from the reproducing circuit 13. Next, the inverse DCT circuit (MPEG) 83 applies inverse DCT to the output signal of the inverse quantization circuit (MPEG) 82 on the basis of the output signal (DCT mode information) from the reproducing circuit 13. Next the de-shuffling circuit 84 de-shuffles the output signal of the inverse DCT circuit (MPEG) 83.

Next, the reverse macro block assembling circuit (semi-MPEG) 85 reassembles a digital video signal from the output signal (macro blocks) of the de-shuffling circuit 84. That is to say, it performs operation reverse to that performed by the macro block assembling circuit (semi-MPEG) 20 on the recording side.

More specifically, referring to FIG. 4, the reverse macro block assembling circuit (semi-MPEG) 85 assembles a digital video signal (for HDTV broadcast <studio standard>) composed of a luminance signal (Y) with 1920 pixels*1080 lines and two color difference signals (Pb, Pr) with 960 pixels*1080 lines from the macro blocks given from the de-shuffling circuit 84.

The digital video signal recording and reproducing device thus outputs a digital video signal and an MPEG stream.

As explained above, according to this embodiment, the reproducing side can extract a digital video signal and an MPEG stream.

A fourth embodiment described next is a modification of the second embodiment, where the reproducing side can extract a digital video signal as well as an MPEG stream.

(Fourth Embodiment)

A digital video signal recording and reproducing device of the fourth embodiment of the invention (hereinafter referred to as digital video signal recording and reproducing device) has the decoding circuit 70 in addition to the structure of the digital video signal recording and reproducing device of the second embodiment. That is to say, the basic structure of the digital video signal recording and reproducing device is the same as that of the digital video signal recording and reproducing device of the third embodiment. Therefore it is described referring to FIG. 8.

As in the second embodiment, it is assumed that a digital video signal for HDTV broadcast <studio standard> is inputted to the digital video signal recording and reproducing device. The recording medium 12 is a magnetic tape.

In FIG. 8, the compression circuit 10, recording circuit 11 and reproducing circuit 13 are the same as those shown in FIG. 1. The structure of the compression circuit 10 is shown in FIG. 2.

Figure 11:
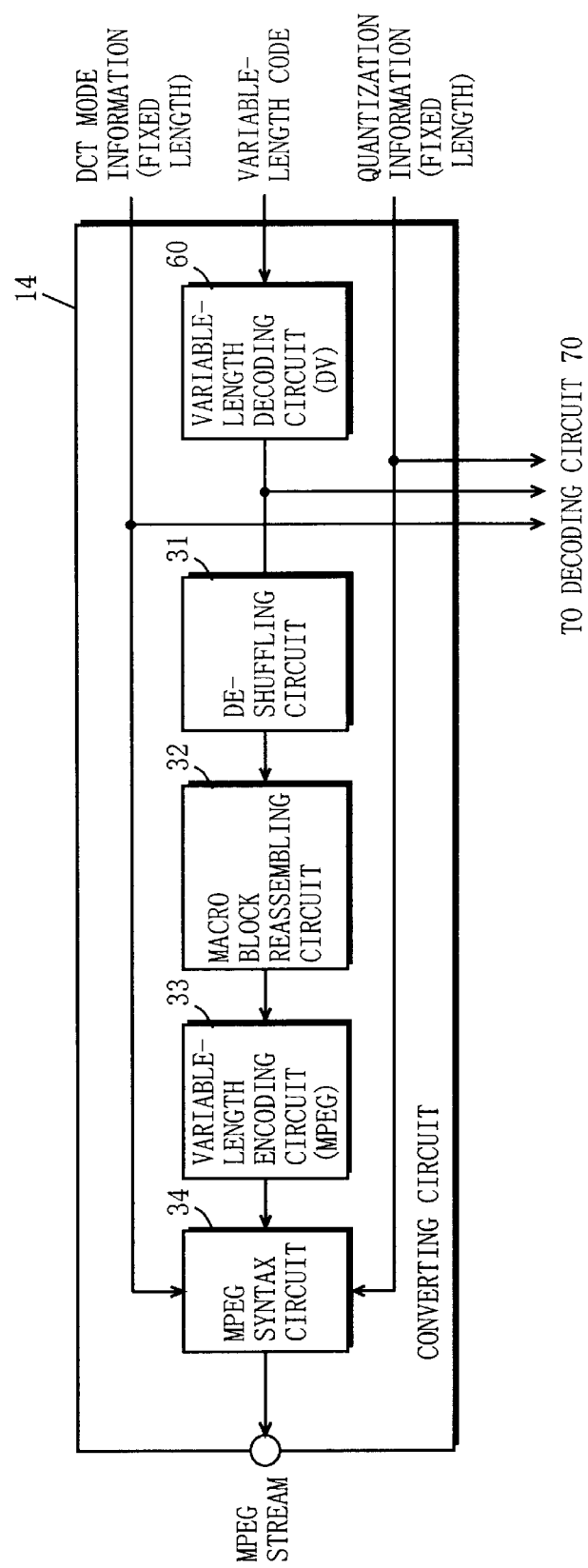
FIG. 11 is a block diagram showing the structure of the converting circuit 14 of FIG. 8 (fourth embodiment).

FIG. 11 is a block diagram showing the structure of the converting circuit 14 of FIG. 8. The converting circuit 14 shown in FIG. 11 has basically the same structure as the converting circuit 14 of FIG. 7. The converting circuit 14 of FIG. 11 differs from the converting circuit 14 of FIG. 7 in that the output signal of the variable-length decoding circuit (DV) 60 is given also to the decoding circuit 70.

The decoding circuit 70 performs operation reverse to that of the compression circuit 10.

The structure of the decoding circuit 70 of FIG. 8 is shown in FIG. 10 (see the third embodiment for the operation of the components shown in FIG. 10).

Operation of this digital video signal recording and reproducing device is now described.

In FIG. 8, when the digital video signal is inputted to the digital video signal recording and reproducing device, the compression circuit 10, recording circuit 11, reproducing circuit 13 and converting circuit 14 operate as explained in the second embodiment.

The decoding circuit 70 receives the output signal of the variable-length decoding circuit (DV) 60 of the converting circuit 14 (FIG. 11) and the output signal of the reproducing circuit 13 (the DCT mode information and quantization information).

The following operations are the same as those described in the third embodiment.

The digital video signal recording and reproducing device thus outputs a digital video signal and an MPEG stream.

As described above, according to this embodiment, the reproducing side can extract a digital video signal and an MPEG stream.

A fifth embodiment described next is a modification of the fourth embodiment, where the image format of the digital video signal is converted from the HDTV broadcast <studio standard> into a new format so that DV recording circuits can be used as the recording circuit 11.

(Fifth Embodiment)

The basic structure of a digital video signal recording and reproducing device of the fifth embodiment of the invention (hereinafter referred to as digital video signal recording and reproducing device) is the same as that of the digital video signal recording and reproducing device of the fourth embodiment. Therefore it is described referring to FIG. 8.

As in the fourth embodiment, it is assumed that a digital video signal for HDTV broadcast <studio standard> is inputted to the digital video signal recording and reproducing device. The recording medium 12 is a magnetic tape.

Figure 12:
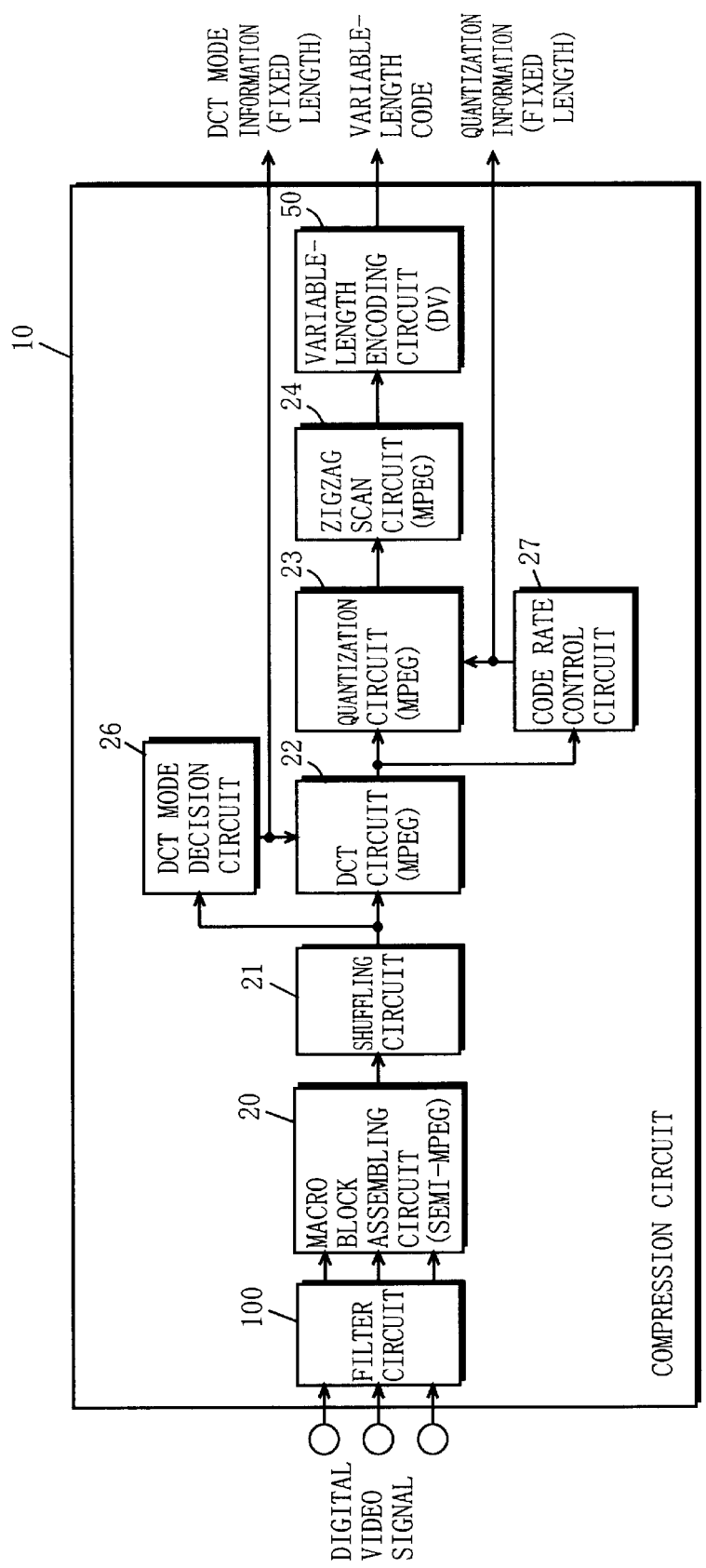
FIG. 12 is a block diagram showing the structure of the compression circuit 10 of FIG. 8 (fifth embodiment).

FIG. 12 is a block diagram showing the structure of the compression circuit 10 of FIG. 8. In the compression circuit 10 shown in FIG. 12, the compression circuit 10 shown in FIG. 6 further includes a filter circuit 100.

In FIG. 12, the filter circuit 100 converts the image format of the input digital video signal. Other components operate in the same way as those shown in FIG. 6 (see the second and fourth embodiments) except for some changes made for the conversion of the format (described later).

Figure 13:
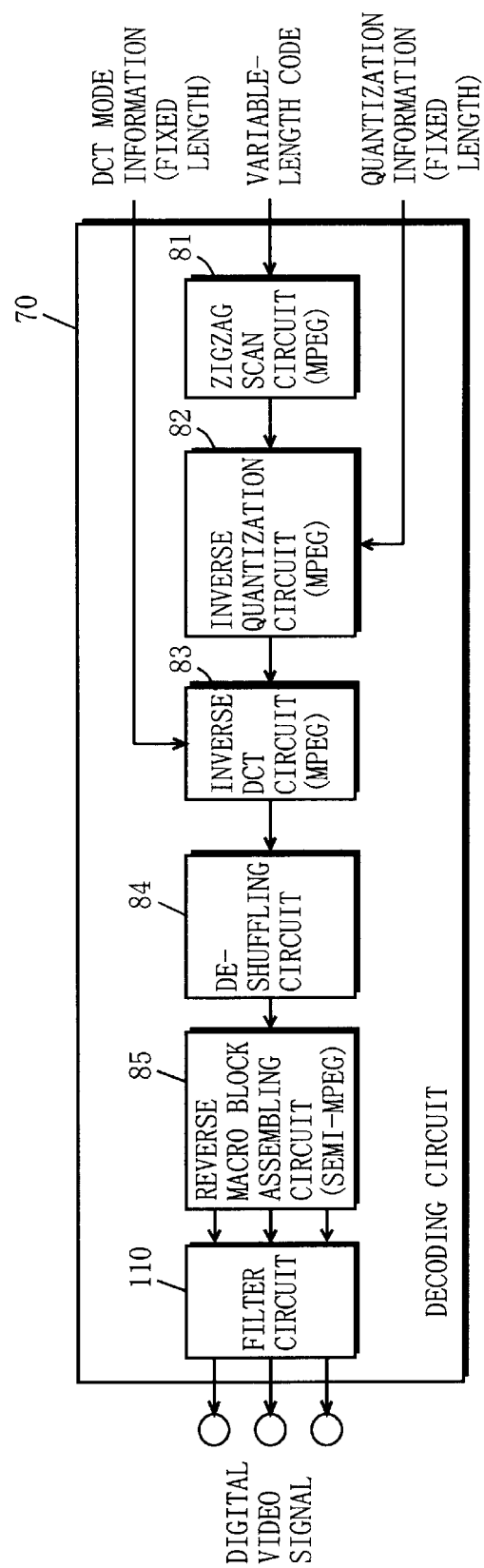
FIG. 13 is a block diagram showing the structure of the decoding circuit 70 of FIG. 8 (fifth embodiment).

FIG. 13 is a block diagram showing the structure of the decoding circuit 70 of FIG. 8. In the decoding circuit 70 shown in FIG. 13, the decoding circuit 70 shown in FIG. 10 further includes a filter circuit 110.

In FIG. 13, the filter circuit 110 reversely converts the image format of the output signal of the reverse macro block assembling circuit. Other components operate in the same way as those shown in FIG. 10 (see the second and fourth embodiments) except for some changes made for the conversion of the format (described later).

Other components are the same as those shown in the fourth embodiment.

Operation of this digital video signal recording and reproducing device is now described.

In FIG. 8, the digital video signal is inputted to the compression circuit 10.

In the compression circuit 10 of FIG. 12, first, the filter circuit 100 converts the image format of the input digital video signal from HDTV broadcast <studio standard> into a new image format as shown below.

In the new image format, the number of effective lines is 1080 for both of luminance and color difference, and the number of horizontal effective samples is 1280 pixels for luminance and 640 pixels for color difference (4:2:2) (this format is referred to as new HD format hereinafter).

Next, the macro block assembling circuit (semi-MPEG) 20 assembles macro blocks from the output signal of the filter circuit 100. While this macro block assembling process is basically the same as that performed by the macro block assembling circuit of FIG. 6 (see FIG. 4), a different number of macro blocks are assembled for each frame because of the format conversion performed prior to this process.

Figure 14:
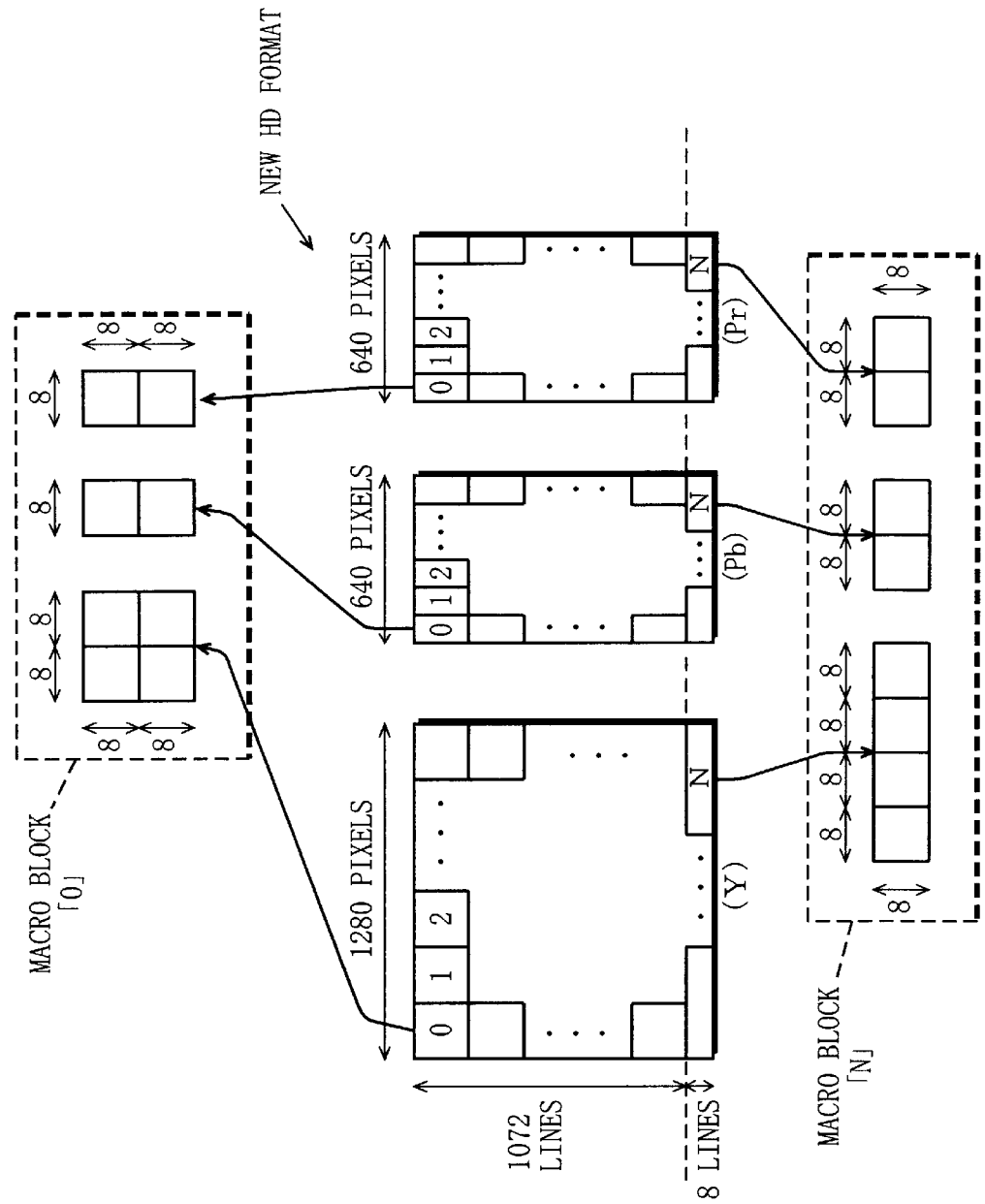
FIG. 14 is a diagram used to explain the process in which the macro block assembling circuit (semi-MPEG) 20 of FIG. 12 assembles macro blocks from the output signal (new HD format) of the filter circuit 100.

Therefore, the operation of the macro block assembling circuit (semi-MPEG) 20 is now described referring to FIG. 14.

FIG. 14 is a diagram in assistance of explaining the process in which the macro block assembling circuit (semi-MPEG) 20 of FIG. 12 assembles macro blocks from the output signal of the filter circuit 100 (new HD format).

In FIG. 14, the digital video signal (new HD format) is composed of a luminance signal (Y) with 1280 pixels*1080 lines and two color difference signals (Pb, Pr) with 640 pixels*1080 lines.

The macro block assembling circuit (semi-MPEG) 20 first divides the luminance and color difference signals into upper 1072 lines and lower 8 lines.

Next, the macro block assembling circuit (semi-MPEG) 20 applies the following processing to the upper 1072 lines of the luminance signal and the color difference signals. That is to say, it extracts 2*2=4 blocks as a unit from the luminance signal, where each block consisting of 8 pixels*8 lines. It also extracts two blocks from each of the two color difference signals, where each block consisting of 8 pixels*8 lines. The extracted 8 blocks are handled as one macro block (in the drawing the macro block "0").

Next, the macro block assembling circuit (semi-MPEG) 20 applies the following processing to the lower 8 lines of the luminance and color difference signals. That is to say, it extracts 4*1=4 blocks as a unit from the luminance signal, where each block consisting of 8 pixels*8 lines. It also extracts two blocks from each of the two color difference signals, each block consisting of 8 pixels*8 lines. The extracted 8 blocks are handled as one macro block (in the drawing the macro block "N").

Accordingly, the macro block assembling circuit (semi-MPEG) 20 assembles 5400 macro blocks per frame from the digital video signal (new HD format).

Next, Referring to FIG. 12 again, the shuffling circuit 21 shuffles the output signal of the macro block assembling circuit (semi-MPEG) 20. The following processes performed in the compression circuit 10 are the same as those described in the fourth embodiment.

Next, referring to FIG. 8, the recording circuit 11 records the output signal of the compression circuit 10 on the magnetic tape (the variable-length code, DCT mode information and quantization information). In this process, the recording circuit 11 writes one frame of signal (5400 macro blocks) in a region of a predetermined size (40 tracks=5400 sync blocks in this example). This processing is the same as that of the recording circuit 171 of FIG. 19 except for the recording rate (see FIG. 24).

That is, in FIG. 24, the recording circuit 11 receives, in units of 5 macro blocks (1 macro block=8 blocks), the variable-length code (8 blocks) outputted from the variable-length encoding circuit (DV) 50, the DCT mode information outputted from the DCT mode decision circuit 26, and the quantization information outputted from the code rate control circuit 27.

The recording circuit 11 records the variable-length code, DCT mode information and quantization information on the magnetic tape so that 5 macro blocks are stored in 5 sync blocks (refer to BACKGROUND ART for details).

Next, referring to FIG. 8 again, the reproducing circuit 13 reproduces the digital video signal recorded on the magnetic tape. The output signal of the reproducing circuit 13 (the variable-length code, DCT mode information, and quantization information) is inputted to the converting circuit 14 and the decoding circuit 70.

The converting circuit 14 converts the DV stream into an MPEG stream (see the second embodiment) and the decoding circuit 70 performs process reverse to that performed by the compression circuit 10 before.

The digital video signal recording and reproducing device thus outputs a digital video signal and an MPEG stream.

While the macro block assembling circuit (semi-MPEG) 20 described above assembles macro blocks as shown in FIG. 14, it can achieve this process in any way as long as it can assemble 5400 macro blocks per frame from a digital video signal (new HD format) without increasing the number of its effective lines (i.e. without adding dummy blocks).

Now, as stated above, the macro block assembling circuit (semi-MPEG) 20 in the compression circuit 10 assembles 5400 macro blocks per frame from the digital video signal (new HD format). Accordingly, when recording the output signal of the compression circuit 10 on the magnetic tape, the recording circuit 11 writes one frame of signal (5400 macro blocks) in 40 tracks on the magnetic tape (=5400 sync blocks).

The recording circuit 11 operating in this way can be realized by using four of the recording circuit provided in the conventional DV-VCR <SD>, for example.

That is, in the conventional DV-VCR <SD>, the macro block assembling circuit assembles 1350 macro blocks per frame from a digital video signal (SD format) and the recording circuit hence writes one frame of signal (1350 macro blocks) in 10 tracks (=1350 sync blocks).

Figure 15:
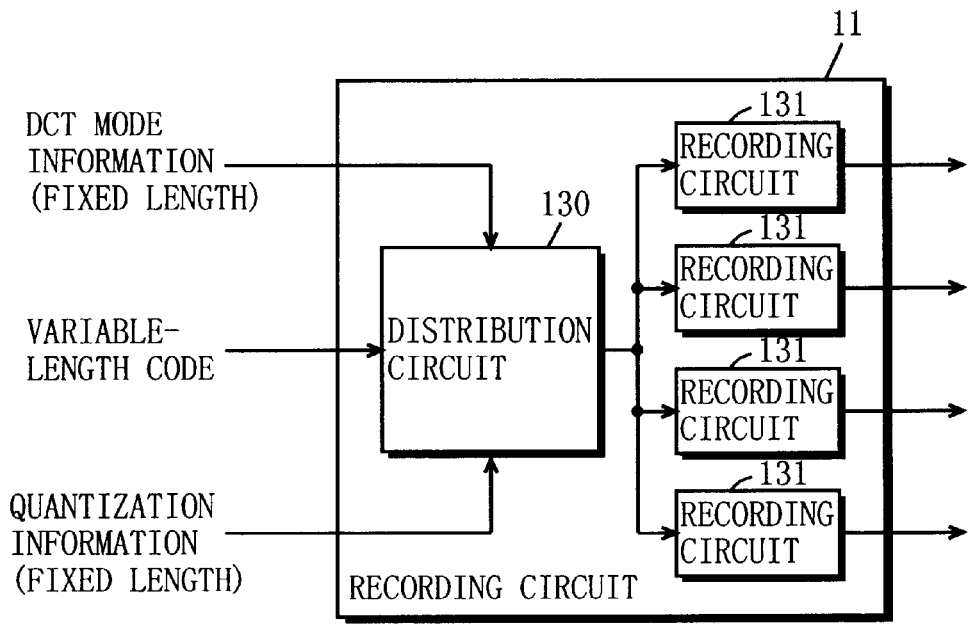
FIG. 15 is a block diagram showing an example of the structure of the recording circuit 11 of FIG. 8 (fifth embodiment).

Therefore, the recording circuit 11 which writes one frame of signal (1350*4=5400 macro blocks) in 10*4=40 tracks (1350*4=5400 sync blocks) on the magnetic tape can be realized by using four recording circuits 131 connected in parallel as shown in FIG. 15.

That is to say, FIG. 15 is a block diagram showing an example of the structure of the recording circuit 11 of FIG. 8.

In FIG. 15, the recording circuit 11 includes a distribution circuit 130 and four recording circuits 131. The four recording circuits 131 are circuits like that provided in the DV-VCR <SD> described in BACKGROUND ART.

The distribution circuit 130 receives the output signal of the compression circuit 10 (variable-length code, DCT mode information and quantization information). The distribution circuit 130 evenly distributes the signal as outputs to the four recording circuits 131. In response, each recording circuit 131 writes one frame of signal (1350 macro blocks) in 10 tracks (=1350 sync blocks).

Figure 16:
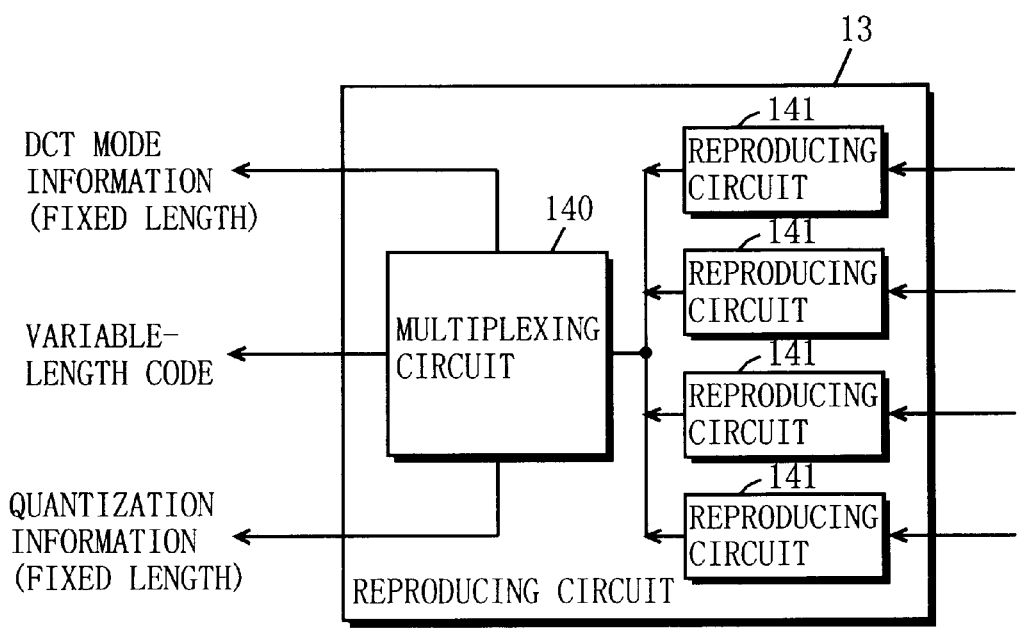
FIG. 16 is a block diagram showing an example of the structure of the reproducing circuit 13 of FIG. 8 (fifth embodiment).

In this case, needless to say, the reproducing circuit 13 can also be realized by using four of the reproducing circuit provided in the conventional DV-VCR <SD>. FIG. 16 shows an example of the structure of the reproducing circuit 13 of FIG. 8.

In FIG. 16, the reproducing circuit 13 includes four reproducing circuits 141 and a multiplexing circuit 140. The four reproducing circuits 141 are circuits like the reproducing circuit provided in the DV-VCR <SD>. The multiplexing circuit 140 receives the output signals of the four reproducing circuits 141. The multiplexing circuit 140 multiplexes the signals supplied. The output signal of the multiplexing circuit 140 is given to the converting circuit 14 and the decoding circuit 70.

Alternatively, the recording circuit 11 which operates as explained above can be realized by using two of the recording circuit provided in the conventional DV-VCR <HD>.

That is to say, the macro block assembling circuit in the conventional DV-VCR <HD> assembles 2700 macro blocks per frame from a digital video signal (HD format) and hence the recording circuit writes one frame of signal (2700 macro blocks) in 20 tracks (=2700 sync blocks).

Figure 17:
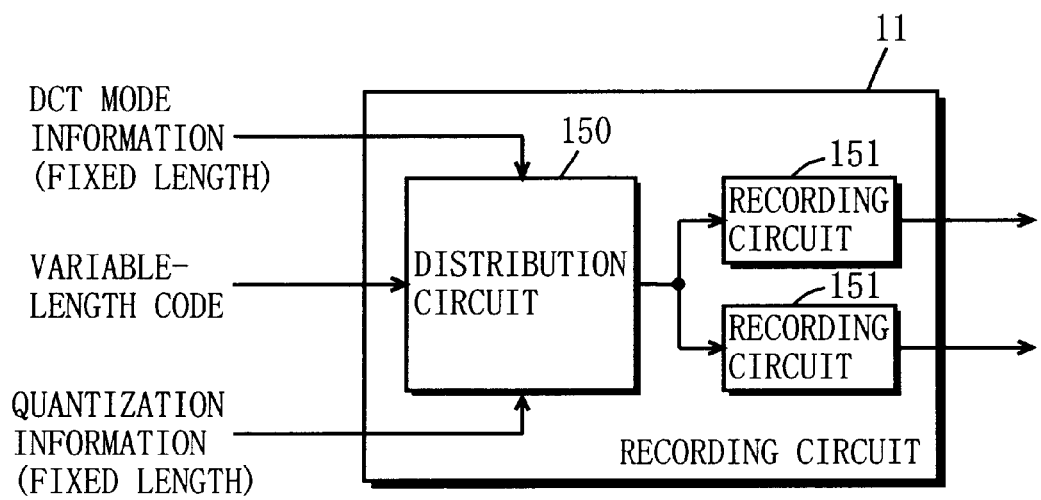
FIG. 17 is a block diagram showing another example of the structure of the recording circuit 11 of FIG. 8 (fifth embodiment).

Accordingly, the recording circuit 11 which writes one frame of signal (2700*2=5400 macro blocks) in 20*2=40 tracks (2700*2=5400 sync blocks) on the magnetic tape can be realized by using two recording circuits 151 connected in parallel as shown in FIG. 17.

That is to say, FIG. 17 is a block diagram showing another example of the structure of the recording circuit 11 of FIG. 8.

In FIG. 17, the recording circuit 11 includes a distribution circuit 150 and two recording circuits 151. The two recording circuits 151 are circuits like the recording circuit 171 provided in the DV-VCR <HD> described in BACKGROUND ART.

The distribution circuit 150 receives the output signal of the compression circuit 10 (variable-length code, DCT mode information and quantization information). The distribution circuit 150 evenly distributes the signal as outputs to the two recording circuits 151. In response, each recording circuit 151 writes one frame of signal (2700 macro blocks) in 20 tracks (=2700 sync blocks).

Figure 18:
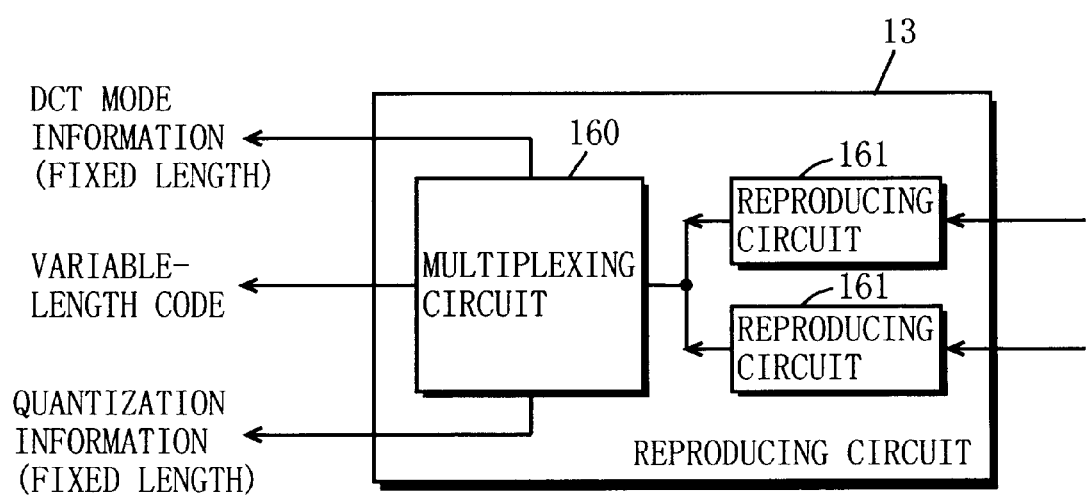
FIG. 18 is a block diagram showing another example of the structure of the reproducing circuit 13 of FIG. 8 (fifth embodiment).

In this case, needless to say, the reproducing circuit 13 can also be realized by using two of the reproducing circuit provided in the conventional DV-VCR <HD>. FIG. 18 shows an example of the structure of the reproducing circuit 13 of FIG. 8.

In FIG. 18, the reproducing circuit 13 includes two reproducing circuits 161 and a multiplexing circuit 160. The two reproducing circuits 161 are circuits like the reproducing circuit 173 provided in the DV-VCR <HD>. The multiplexing circuit 160 receives the output signals of the two reproducing circuits 161. The multiplexing circuit 160 multiplexes the signals supplied. The output signal of the multiplexing circuit 160 is given to the converting circuit 14 and the decoding circuit 70.

As described above, according to this embodiment, the image format of the digital video signal is converted from the HDTV broadcast <studio standard> into the new HD format, so that the recording circuits and reproducing circuits for DV can be used as the recording circuit 11 and the reproducing circuit 13. Existing DV circuits can thus be used to reduce the cost of development of the digital video signal recording and reproducing device.

While an HDTV broadcasting digital video signal <studio standard> is recorded in this embodiment, other digital video signals having other formats may be recorded. In such cases, adequate filter circuits are used in place of the filter circuits 100 and 110 to convert the digital video signal format into the new HD format.

(Another Embodiment)

Another embodiment is directed to a digital video signal transmission device in which the receiving end can extract an MPEG stream with a simple structure and without serious deterioration of the image quality, and without wastefully consuming bands of the transmission medium. In the digital video signal recording and reproducing devices of the first to fifth embodiments, such a transmission device can be realized by replacing the recording circuit with a packetizing circuit, the recording medium with a transmission medium, and the reproducing circuit with a streaming circuit. For the transmission medium, ATM network, SDI network, Ethernet etc. can be used.

For example, in the digital video signal recording and reproducing device of the first embodiment (see FIG. 1), the recording circuit 11 is replaced by a packetizing circuit, the recording medium 12 by a transmission medium, and the reproducing circuit 13 by a streaming circuit. In the digital video signal transmission device thus constructed, the packetizing circuit fixed-length-packetizes the output signal of the compression circuit 10. The fixed-length packets are transmitted from the transmitting end including the compression circuit 10 and the packetizing circuit to the receiving end including the streaming circuit and the converting circuit 14 through the transmission medium. The streaming circuit streams the fixed-length packets transmitted through the transmission medium.

In this process, it is defined by a standard that, in the transmission through the transmission medium, a frame of signal should be stored in a given number of fixed-length packets, e.g. in 8100 fixed-length packets. In order to meet the standard, the macro block assembling circuit (semi-MPEG) 20 in the compression circuit 10 assembles 8100 macro blocks per frame without, unlike MPEG, adding dummy blocks, and the code rate control circuit 27 controls the code rate so that 5 macro blocks can be exactly, without any remainder nor shortage, stored in 5 fixed-length packets.

Note that the DCT/inverse DCT, quantization/inverse quantization, zigzag scanning etc. are not described in detail herein because those are not directly connected to the features of the present invention.

INDUSTRIAL APPLICABILITY

As explained so far, when the digital video signal recording and reproducing device of the present invention records/reproduces a digital video signal in which the number of effective lines is not a multiple of 16, the reproducing side can extract an MPEG stream with a simple structure and without noticeable deterioration of the image quality, and without wastefully consuming the capacity of the recording medium.

What is claimed is:

1. A device for recording a digital video signal in which the remainder left when the number of its effective lines is divided by 16 is not less than 1 and not more than 8, said device comprising:
compressing means for compressing the digital video signal according to a procedure which partially differs from an MPEG standard; and
recording means for recording an output signal of said compressing means on a recording medium,
said compressing means comprising,
macro block assembling means for adding dummy lines of 7 lines maximum to the effective lines of said digital video signal and assembling macro blocks with 16 lines and macro blocks with 8 lines, and
DCT means for applying field DCT (Discrete Cosine Transform; which applies hereinafter) or frame DCT defined by the MPEG standard to said macro blocks with 16 lines and applying only the frame DCT defined by the MPEG standard to said macro blocks with 8 lines.

2. A device for recording and reproducing a digital video signal in which the remainder left when the number of its effective lines is divided by 16 is not less than 1 and not more than 8, said device comprising:
compressing means for compressing the digital video signal according to a procedure which partially differs from an MPEG standard;
recording means for recording an output signal of said compressing means on a recording medium;
reproducing means for reproducing the signal recorded on said recording medium; and
converting means for converting an output signal of said reproducing means into an MPEG stream,
said compressing means comprising,
macro block assembling means for adding dummy lines of 7 lines maximum to the effective lines of said digital video signal and assembling macro blocks with 16 lines and macro blocks with 8 lines, and
DCT means for applying field DCT (Discrete Cosine Transform; which applies hereinafter) or frame DCT defined by the MPEG standard to said macro blocks with 16 lines and applying only the frame DCT defined by the MPEG standard to said macro blocks with 8 lines, and
said converting means comprising macro block reassembling means for reassembling the macro blocks assembled by said macro block assembling means into macro blocks which are equivalent to those obtained by performing a process of increasing the number of effective lines as defined by the MPEG standard.

3. The digital video signal recording and reproducing device according to claim 2, wherein
said process of increasing the number of effective lines is a process of, when assembling macro blocks, adding dummy blocks to a digital video signal in which the number of effective lines is not a multiple of 16 to make the number of effective lines a multiple of 16, and
said macro block reassembling means adds dummy blocks of 8 lines to the macro blocks assembled by said macro block assembling means to reassemble the macro blocks equivalent to those obtained by performing said process of increasing the number of lines.

4. The digital video signal recording and reproducing device according to claim 2, wherein
said compressing means further comprises,
encoding means for quantizing and variable-length encoding an output signal of said DCT means according to the procedure which partially differs from the MPEG standard, and
code rate control means for generating quantization information for controlling the code rate of the macro blocks assembled by said macro block assembling means so that N (N is an arbitrary natural number; which applies thereinafter) of the macro blocks can be exactly, without any reminder or shortage, stored in N of fixed-length sync blocks, and
said recording means records the output signal of said compressing means on the recording medium in such a manner that one frame of said output signal is stored in a given number of fixed-length sync blocks on said recording medium.

5. The digital video signal recording and reproducing device according to claim 2, wherein
said compressing means further comprises,
quantization means for quantizing an output signal of said DCT means according to the MPEG standard,
variable-length encoding means for variable-length encoding an output signal of said quantization means according to the MPEG standard, and
code rate control means for generating quantization information for controlling the code rate of the macro blocks assembled by said macro block assembling means so that N (N is an arbitrary natural number; which applies thereinafter) of the macro blocks can be exactly, without any reminder nor shortage, stored in N of fixed-length sync blocks,
said converting means further comprises variable-length decoding means for variable-length decoding an output signal of said variable-length encoding means according to the MPEG standard and outputting a signal obtained by this process to said macro block reassembling means, and
said code rate control means generates said quantization information on the basis of the output signal of said DCT means and provides said quantization information to said quantization means.

6. The digital video signal recording and reproducing device according to claim 2, wherein
said compressing means further comprises,
quantization means for quantizing an output signal of said DCT means according to the MPEG standard,
DV variable-length encoding means for variable-length encoding an output signal of said quantization means according to a DV standard, and
code rate control means for generating quantization information for controlling the code rate of the macro blocks assembled by said macro block assembling means so that N (N is an arbitrary natural number; which applies thereinafter) of the macro blocks can be exactly, without any reminder nor shortage, stored in N of fixed-length sync blocks, and
said converting means further comprises,
DV variable-length decoding means for variable-length decoding an output signal of said DV variable-length encoding means according to the DV standard and outputting a signal obtained by this process to said macro block reassembling means, and
MPEG variable-length encoding means for variable-length encoding an output signal of said macro block reassembling means according to the MPEG standard, and said code rate control means generates said quantization information on the basis of the output signal of said DCT means and provides said quantization information to said quantization means.

7. The digital video signal recording and reproducing device according to claim 6, wherein said compressing means further comprises filter means for converting the format of said digital video signal into a format in which the number of effective lines is 1080 lines for both of luminance and color difference and the number of horizontal effective samples is 1280 pixels for luminance and 640 pixels for color difference, said macro block assembling means assembles 5400 macro blocks per frame from said digital video signal of the converted format without performing said process of increasing the number of effective lines, and said recording means records the output signal of said compressing means on the recording medium in such a manner that one frame of the output signal is stored in 5400 fixed-length sync blocks on the recording medium.

8. The digital video signal recording and reproducing device according to claim 7, wherein said recording means comprises,
four DV recording circuits provided in parallel each recording an input signal on said recording medium in such a manner that one frame of said input signal is stored in 1350 fixed-length sync blocks on the recording medium, and
distributing means for evenly distributing and outputting the output signal of said compressing means to said four DV recording circuits.

9. The digital video signal recording and reproducing device according to claim 7, wherein said recording means comprises,
two DV recording circuits provided in parallel, each recording an input signal on said recording medium in such a manner that one frame of said input signal is stored in 2700 fixed-length sync blocks on the recording medium, and
distributing means for evenly distributing and outputting the output signal of said compressing means to said two DV recording circuits.

10. The digital video signal recording and reproducing device according to claim 7, wherein said digital video signal has a format in which the number of effective lines is 1080 lines for both of luminance and color difference and the number of horizontal effective samples is 1920 pixels for luminance and 960 pixels for color difference.

11. The digital video signal recording and reproducing device according to claim 2, further comprising decoding means for decoding the output signal of said reproducing means, wherein said decoding means comprises reverse macro block assembling means for reversely assembling a signal equivalent to said digital video signal from the macro blocks assembled by said macro block assembling means.

12. The digital video signal recording and reproducing device according to claim 11, wherein said process of increasing the number of effective lines is a process of, when assembling macro blocks, adding a dummy line or dummy lines to a digital video signal in which the number of its effective lines is not a multiple of 16 to make the number of effective lines a multiple of 16, said macro block reassembling means reassembles the macro blocks equivalent to those obtained by performing said process of increasing the number of lines by adding dummy blocks with 8 lines to the macro blocks assembled by said macro block assembling means, and said reverse macro block assembling means reversely assembles the signal equivalent to said digital video signal by removing the dummy lines of 7 lines maximum from the macro blocks assembled by said macro block assembling means.

13. The digital video signal recording and reproducing device according to claim 11, wherein said compressing means further comprises,
quantization means for quantizing an output signal of said DCT means according to the MPEG standard,
variable-length encoding means for variable-length encoding an output signal of said quantization means according to the MPEG standard, and
code rate control means for generating quantization information for controlling the code rate of the macro blocks assembled by said macro block assembling means so that N (N is an arbitrary natural number; which applies thereinafter) of the macro blocks can be exactly, without any remainder nor shortage, stored in N of fixed-length sync blocks, said converting means further comprises
variable-length decoding means for variable-length decoding the output signal of said reproducing means according to the MPEG standard and outputting a signal obtained by this process to said macro block reassembling means and said decoding means, said decoding means further comprises,
inverse quantization means for inversely quantizing the output signal of said variable-length decoding means according to the MPEG standard, and
inverse DCT means for applying inverse DCT to an output signal of said inverse quantization means according to the MPEG standard and outputting a signal obtained by this process to said reverse macro block assembling means, and said code rate control means generates said quantization information on the basis of the output signal of said DCT means and provides said quantization information to said quantization means.

14. The digital video signal recording and reproducing device according to claim 11, wherein said compressing means further comprises,
quantization means for quantizing an output signal of said DCT means according to the MPEG standard,
DV variable-length encoding means for variable-length encoding an output signal of said quantization means according to a DV standard, and
code rate control means for generating quantization information for controlling the code rate of the macro blocks assembled by said macro block assembling means so that N (N is an arbitrary natural number; which applies thereinafter) of the macro blocks can be exactly, without any remainder nor shortage, stored in N of fixed-length sync blocks, said converting means further comprises,
DV variable-length decoding means for variable-length decoding the output signal of said reproducing means according to the DV standard and outputting a signal obtained by this process to said macro block reassembling means and said decoding means, and
MPEG variable-length encoding means for variable-length encoding the output signal of said DV variable-length decoding means according to the MPEG standard, said decoding means further comprises,
inverse quantization means for inversely quantizing the output signal of said DV variable-length decoding means according to the MPEG standard, and
inverse DCT means for applying inverse DCT to an output signal of said inverse quantization means according to the MPEG standard and outputting a signal obtained by this process to said reverse macro block assembling means, and said code rate control means generates said quantization information on the basis of the output signal of said DCT means and provides said quantization information to said quantization means.

15. The digital video signal recording and reproducing device according to claim 14, wherein said compressing means further comprises first filter means for converting the format of said digital video signal into a format in which the number of effective lines is 1080 lines for both of luminance and color difference and the number of horizontal effective samples is 1280 pixels for luminance and 640 pixels for color difference, said macro block assembling means assembles 5400 macro blocks per frame from said digital video signal of the converted format without performing said process of increasing the number of effective lines, said recording means records the output signal of said compressing means on the recording medium in such a manner that one frame of the signal is stored in 5400 fixed-length sync blocks on the recording medium, and said decoding means further comprises second filter means for converting the format of an output signal of said reverse macro block assembling means into a format equivalent to that of said digital video signal.

16. The digital video signal recording and reproducing device according to claim 15, wherein
said recording means comprises,
four DV recording circuits provided in parallel each recording an input signal on said recording medium in such a manner that one frame of said input signal is stored in 1350 fixed-length sync blocks on the recording medium, and
distributing means for evenly distributing and outputting the output signal of said compressing means to said four DV recording circuits.

17. The digital video signal recording and reproducing device according to claim 15, wherein
said recording means comprises,
two DV recording circuits provided in parallel each recording an input signal on said recording medium in such a manner that one frame of said input signal is stored in 2700 fixed-length sync blocks on the recording medium, and
distributing means for evenly distributing and outputting the output signal of said compressing means to said two DV recording circuits.

18. The digital video signal recording and reproducing device according to claim 15, wherein said digital video signal has a format in which the number of effective lines is 1080 lines for both of luminance and color difference and the number of horizontal effective samples is 1920 pixels for luminance and 960 pixels for color difference.

19. A device for transmitting a digital video signal in which the remainder left when the number of its effective lines is divided by 16 is not less than 1 and not more than 8, said device comprising:

compressing means for compressing the digital video signal according to a procedure which partially differs from MPEG;

transmitting means for transmitting an output signal of said compressing means through a transmission medium in such a manner that one frame of the output signal is stored in a given number of fixed-length packets on the transmission medium; and converting means for converting a signal transmitted through said transmission medium into an MPEG stream, said compressing means comprising,
a macro block assembling means for adding dummy lines of 7 lines maximum to the effective lines of said digital video signal and assembling macro blocks with 16 lines and macro blocks with 8 lines, and
DCT means for applying field DCT (Discrete Cosine Transform; which applies hereinafter) or frame DCT defined by the MPEG standard to said macro blocks with 16 lines and applying only the frame DCT defined by the MPEG standard to said macro blocks with 8 lines, and said converting means comprising macro block reassembling means for reassembling the macro blocks assembled by said macro block assembling means into macro blocks which are equivalent to those obtained by performing a process of increasing the number of effective lines as defined by the MPEG standard.

* * * * *